United States Patent
Kaufman et al.

(10) Patent No.: US 11,348,228 B2
(45) Date of Patent: May 31, 2022

(54) SYSTEM, METHOD, AND COMPUTER-ACCESSIBLE MEDIUM FOR VIRTUAL PANCREATOGRAPHY

(71) Applicant: The Research Foundation for The State University of New York, Albany, NY (US)

(72) Inventors: Arie Kaufman, Plainview, NY (US); Konstantin Dmitriev, Port Jefferson, NY (US)

(73) Assignee: The Research Foundation for the State University of New York

( * ) Notice: Subject to any disclaimer, the term of this patent is extended or adjusted under 35 U.S.C. 154(b) by 139 days.

(21) Appl. No.: 16/626,662

(22) PCT Filed: Jun. 26, 2018

(86) PCT No.: PCT/US2018/039391
§ 371 (c)(1),
(2) Date: Dec. 26, 2019

(87) PCT Pub. No.: WO2019/005722
PCT Pub. Date: Jan. 3, 2019

(65) Prior Publication Data
US 2020/0226748 A1    Jul. 16, 2020

Related U.S. Application Data

(60) Provisional application No. 62/524,819, filed on Jun. 26, 2017.

(51) Int. Cl.
*G06T 7/00* (2017.01)
*G06T 7/11* (2017.01)
(Continued)

(52) U.S. Cl.
CPC ......... *G06T 7/0012* (2013.01); *G06N 3/0454* (2013.01); *G06N 20/20* (2019.01);
(Continued)

(58) Field of Classification Search
CPC . G06T 2207/30096; G06T 2207/20081; G06T 7/11; G06T 7/0012; G06N 3/0454; G06N 20/20
See application file for complete search history.

(56) References Cited

U.S. PATENT DOCUMENTS 6,396,270 B1    5/2002   Smith
7,756,314 B2    7/2010   Karau et al.
(Continued)

FOREIGN PATENT DOCUMENTS

CN    108447046 A    7/2019
CN    110706207 A    1/2020
(Continued)

OTHER PUBLICATIONS

Gazit et al. "Quantification of CT images for the classification of high- and low-risk pancreatic cysts"; SPIE Medical Imaging, 2017, Orlando, Florida, United States, pp. 1-7.*
(Continued)

*Primary Examiner* — Mia M Thomas
(74) *Attorney, Agent, or Firm* — ACKnowledge IP P.C.

(57) ABSTRACT

A system, method, and computer-accessible medium for using medical imaging data to screen for a cystic lesion(s) can include, for example, receiving first imaging information for an organ(s) of a one patient(s), generating second imaging information by performing a segmentation operation on the first imaging information to identify a plurality of tissue types, including a tissue type(s) indicative of the cystic lesion(s), identifying the cystic lesion(s) in the second imaging information, and applying a first classifier and a
(Continued)

second classifier to the cystic lesion(s) to classify the cystic lesion(s) into one or more of a plurality of cystic lesion types. The first classifier can be a Random Forest classifier and the second classifier can be a convolutional neural network classifier. The convolutional neural network can include at least 6 convolutional layers, where the at least 6 convolutional layers can include a max-pooling layer(s), a dropout layer(s), and fully-connected layer(s).

20 Claims, 21 Drawing Sheets

(51) Int. Cl.
 *G06N 20/20* (2019.01)
 *G06N 3/04* (2006.01)
(52) U.S. Cl.
 CPC ...... *G06T 7/11* (2017.01); *G06T 2207/20081* (2013.01); *G06T 2207/30096* (2013.01)

(56) References Cited

U.S. PATENT DOCUMENTS

| | | | |
|---|---|---|---|
| 8,090,172 B2 | 1/2012 | Shinagawa et al. | |
| 8,208,697 B2 | 6/2012 | Schaffer et al. | |
| 8,214,020 B2 | 7/2012 | Aulbach et al. | |
| 8,229,186 B2* | 7/2012 | Milstein | G06T 7/181 |
| | | | 382/128 |
| 8,913,807 B1 | 12/2014 | Horn et al. | |
| 9,536,305 B2 | 1/2017 | Giger et al. | |
| 9,959,486 B2 | 5/2018 | Kiraly et al. | |
| 10,041,910 B2* | 8/2018 | Doyle | G01N 29/11 |
| 10,115,197 B1 | 10/2018 | Alsmadi | |
| 10,147,223 B2 | 12/2018 | Kim et al. | |
| 10,383,602 B2 | 8/2019 | Cho et al. | |
| 11,138,731 B2 | 10/2021 | Katzmann et al. | |
| 11,216,948 B2 | 1/2022 | Yang | |
| 11,244,456 B2 | 2/2022 | Kaffenberger et al. | |
| 11,250,569 B2 | 2/2022 | Carmi | |
| 2004/0120557 A1 | 6/2004 | Sabol et al. | |
| 2004/0254503 A1 | 12/2004 | Sarvazyan et al. | |
| 2006/0004278 A1 | 1/2006 | Giger et al. | |
| 2007/0166707 A1* | 7/2007 | Schadt | G16B 40/30 |
| | | | 702/20 |
| 2008/0154154 A1 | 6/2008 | Sarvazyan et al. | |
| 2008/0234578 A1 | 9/2008 | Claus | |
| 2008/0273777 A1* | 11/2008 | Luboz | G06T 7/162 |
| | | | 382/130 |
| 2009/0298054 A1* | 12/2009 | Lesche | C12Q 1/6886 |
| | | | 435/6.12 |
| 2010/0111396 A1* | 5/2010 | Boucheron | G06K 9/6231 |
| | | | 382/133 |
| 2010/0158332 A1 | 6/2010 | Rico et al. | |
| 2012/0189176 A1 | 7/2012 | Giger et al. | |
| 2012/0231480 A1 | 9/2012 | Schmidt et al. | |
| 2014/0163369 A1 | 6/2014 | Nair | |
| 2014/0241606 A1 | 8/2014 | Park et al. | |
| 2014/0349382 A1 | 11/2014 | Thomson et al. | |
| 2015/0087957 A1 | 3/2015 | Liu et al. | |
| 2016/0086326 A1 | 3/2016 | Raschke et al. | |
| 2016/0217262 A1 | 7/2016 | Sharbell et al. | |
| 2016/0321427 A1 | 11/2016 | Bogoni et al. | |
| 2017/0358078 A1 | 12/2017 | Hoff et al. | |
| 2018/0047553 A1* | 2/2018 | Richardson | G01N 9/00 |
| 2018/0068436 A1 | 3/2018 | Bronkalla et al. | |
| 2018/0240235 A1 | 8/2018 | Mazo | |
| 2018/0253840 A1* | 9/2018 | Tran | G16H 40/63 |
| 2018/0276821 A1 | 9/2018 | Lin et al. | |
| 2018/0315193 A1* | 11/2018 | Paschalakis | G06N 3/08 |
| 2019/0066343 A1 | 2/2019 | Bogoni et al. | |
| 2019/0147590 A1* | 5/2019 | Vikal | A61B 5/055 |
| | | | 382/131 |
| 2019/0148011 A1 | 5/2019 | Rao et al. | |
| 2019/0164289 A1 | 5/2019 | Sedlmair et al. | |
| 2019/0164642 A1 | 5/2019 | Hartung et al. | |
| 2019/0246946 A1 | 8/2019 | Kopel et al. | |
| 2019/0279045 A1* | 9/2019 | Li | G06K 9/3241 |
| 2020/0000362 A1 | 1/2020 | Wallace et al. | |
| 2020/0058390 A1 | 2/2020 | Kohle et al. | |
| 2020/0063215 A1* | 2/2020 | Permuth | C12Q 1/6886 |
| 2020/0160032 A1* | 5/2020 | Allen | G06T 7/0012 |
| 2020/0245960 A1* | 8/2020 | Richter | G06K 9/00147 |
| 2020/0359879 A1* | 11/2020 | Cahill | A61B 1/00121 |
| 2020/0364855 A1 | 11/2020 | Ha | |
| 2020/0394792 A1* | 12/2020 | Duval | A61B 1/00009 |
| 2020/0395117 A1 | 12/2020 | Schnorr | |
| 2020/0402236 A1 | 12/2020 | Courot et al. | |
| 2021/0002727 A1* | 1/2021 | Sultana | C12Q 1/6886 |
| 2021/0002728 A1* | 1/2021 | Landau | G16B 20/00 |
| 2021/0035296 A1 | 2/2021 | Mahrooghy et al. | |
| 2021/0090257 A1 | 3/2021 | Bhatia et al. | |
| 2021/0097690 A1 | 4/2021 | Mostapha et al. | |
| 2021/0133958 A1 | 5/2021 | Chen | |
| 2021/0133976 A1 | 5/2021 | Carmi | |
| 2021/0264212 A1 | 8/2021 | Paik et al. | |
| 2021/0279879 A1 | 9/2021 | Kanada | |
| 2021/0287797 A1 | 9/2021 | Halpern et al. | |
| 2021/0319879 A1 | 10/2021 | Zhao et al. | |
| 2021/0343016 A1 | 11/2021 | Tian et al. | |
| 2022/0051402 A1 | 2/2022 | Dikici et al. | |

FOREIGN PATENT DOCUMENTS

| | | |
|---|---|---|
| CN | 110889005 A | 3/2020 |
| CN | 111344801 A | 6/2020 |
| CN | 107292889 B | 9/2020 |
| CN | 109685809 B | 11/2020 |
| CN | 112001925 A | 11/2020 |
| CN | 112070763 A | 12/2020 |
| CN | 112241766 A | 1/2021 |
| CN | 112435243 A | 3/2021 |
| CN | 112967291 A | 6/2021 |
| CN | 113506365 A | 10/2021 |
| CN | 113892148 A | 1/2022 |
| DE | 102004055768 A1 | 6/2005 |
| DE | 102004060396 A1 | 7/2005 |
| DE | 112019005888 T5 | 9/2021 |
| EP | 2116974 B1 | 1/2012 |
| EP | 3493159 A1 | 6/2019 |
| EP | 3447733 B1 | 10/2020 |
| EP | 3646240 A4 | 3/2021 |
| EP | 3796217 A1 | 3/2021 |
| JP | 2004105728 A | 4/2004 |
| JP | 2004105731 A | 4/2004 |
| JP | 2008525126 A | 2/2009 |
| JP | 2009542332 A | 12/2009 |
| JP | 2012512672 A | 6/2012 |
| JP | 5536450 B2 | 7/2014 |
| JP | 5613182 B2 | 10/2014 |
| JP | 2015154918 A | 8/2015 |
| JP | 2018175217 A | 11/2018 |
| JP | 2020032043 A | 1/2022 |
| KR | 101805624 B1 | 12/2017 |
| WO | 2001039123 A1 | 5/2001 |
| WO | 2010101660 A2 | 9/2010 |
| WO | 2014143974 A1 | 9/2014 |
| WO | 2017042812 | 3/2017 |
| WO | 2019204520 A1 | 10/2019 |
| WO | 2019241155 A1 | 12/2019 |
| WO | 2019243344 A1 | 12/2019 |
| WO | 2020056101 A1 | 3/2020 |
| WO | 2020110519 A1 | 6/2020 |
| WO | 2020243574 A1 | 12/2020 |
| WO | 2020251714 A1 | 12/2020 |
| WO | 2020260671 A1 | 12/2020 |
| WO | 2021081839 A1 | 5/2021 |
| WO | 2021125950 A1 | 6/2021 |

(56) References Cited

FOREIGN PATENT DOCUMENTS

| WO | 2021195370 A1 | 9/2021 |
|---|---|---|
| WO | 2022008374 A1 | 1/2022 |

OTHER PUBLICATIONS

Dmitriev et al. "Classification of Pancreatic Cysts in Computed Tomography Images Using a Random Forestand Convolutional Neural Network Ensemble", Med Image Comput Comput Assist Interv. Sep. 2017; 10435: pp. 150-158.*

International Search Report for International Patent Application No. PCT/US208/039391 dated Nov. 5, 2018.

International Written Opinion for International Patent Application No. PCT/US208/039391 dated Nov. 5, 2018.

Cho, H.W. et al., Pancreatic tumors: emphasis on CT findings and pathologic classification. Korean Journal of Radiology 12(6) (2011) 731-739.

Criminisi, A. et al., Decision forests for classification, regression, density estimation, manifold learning and semi-supervised learning. Microsoft Research Cambridge, Tech, Rep. MSRTR-2011-114 5(6) (2011) 12.

Dmitriev, K. et al. Pancreas and cyst segmentation. Proc. of SPIE Medical Imaging (2016) 97842C-97842C.

Ingalhalikar, M. et al., Using multi parametric data with missing features for learning patterns of pathology, Proc. of International Conference on MICCAI (2012) 468-475.

Lennon, A.M. et al., The early detection of pancreatic cancer: What will it take to diagnose and treat curable pancreatic neoplasia? Cancer Research 74(13) (2014) 3381-3389.

Maggioni, M., et al., A.Nonlocal transform-domain filter for volumetric data denoising and reconstruction, IEEE Transactions on Image Processing 22(1) (2013) 119-133.

Raman, S.P. et al., CT texture analysis of renal masses: pilot, study using random forest classification for prediction of pathology. Academic Radiology 21(12) (2014) 1587-1596.

Raman, S.P. et al., Preliminary data using computed tomography texture analysis forthe classification of hypervascular liver lesions: generation of a predictive model on the basis of quantitative spatial frequency measurements—a work in progress. Journal of Computer Assisted Tomography 39(3) (2015) 383-395.

Sahani, D.V. et al., Prospective evaluation of reader performance on mdct in characterization of cystic pancreatic lesions and prediction of cyst biologic aggressiveness. American Journal of Roentgenology 197(1) (2011) W53-W61.

Shin, H.C., et al., Deep convolutional neural networks for computer-aided detection: Cnn architectures, dataset characteristics and transfer learning. IEEE Transactions on Medical Imaging 35(5) (2016) 1285-1298.

Yang, M. et al., A survey of shape feature extraction techniques. Pattern Recognition (2008) 43-90.

Zaheer, A. et al., Incidentally detected cystic lesions of the pancreas on CT: review of literature and management suggestions. Abdominal imaging 38(2) (2013) 331-341.

Chengwen Chu et al., Multi-organ segmentation based on spatially-divided probabilistic atlas from 3D abdominal CT images. International Conference on Medical Image Computing and Computer-Assisted Intervention, (MICCAI), pp. 165-172, 292, 2013.

Jia Deng et al., Imagenet: A large-scale hierarchical image database. Proc. of IEEE Conference on Computer Vision and Pattern Recognition, (CVPR), pp. 248-255, 2009.

Denton, L. Emily et al., Deep generative image models using a laplacian pyramid of adversarial networks. Advances in Neural Information Processing Systems, NIPS, pp. 1486-1494, 2015.

Konstantin Dmitriev et al., Classification of pancreatic cysts in computed tomography images using a random forest and convolutional neural network ensemble. Proc. of International Conference on Medical Image Computing and Computer-Assisted Intervention, (MICCAI), pp. 303-150-158, 2017.

Dou, Qi et al., 3D deeply supervised network for automatic liver segmentation from CT volumes. Proc. of International Conference on Medical Image Computing and Computer-Assisted Intervention, (MICCAI), pp. 149-157, 2016.

Drozdzal, Michal et al., Learning normalized inputs for iterative estimation in medical image segmentation. Medical image analysis, 44:1-13, 2018.

Everingham, Mark et al., The pascal visual object classes (voc) challenge. International Journal of Computer Vision, 88(2): 312 303-338, 2010.

Farag, Amal et al., A bottom-up approach for pancreas segmentation using cascaded superpixels and (deep) image patch labeling. IEEE Transactions on Image Processing, 26(1):386-399, 2017.

Götz, Michael et al., Learning from small amounts of labeled data in a brain tumor classification task. Proc. of Neural Information Processing Systems, NIPS, 2014.

Heimann, Tobias et al., Comparison and evaluation of methods for liver segmentation from CT datasets. IEEE Transactions on Medical Imaging, 28(8):1251-1265, 2009.

Holger, Roth et al., Data from pancreas—CT. Cancer Imaging Archive, 2016.

Huang, Gao et al., Densely connected convolutional networks. Proc. of the IEEE Conference on Computer Vision and Pattern Recognition, (CVPR), 1(2):3, 2017.

Jégou, Simon et al., The one hundred layers tiramisu: Fully convolutional densenets for semantic segmentation. Proc. of IEEE on Computer Vision and Pattern Recognition Workshops (CVPRW), pp. 1175-1183, 2017.

Jimenez-del Toro, Oscar et al., Cloud-based evaluation of anatomical structure segmentation and landmark detection algorithms: Visceral anatomy benchmarks. IEEE Transactions on Medical Imaging, 35(11): 2459-2475, 2016.

Kingma, P. Diederik et al., A method for stochastic optimization, arXiv preprint :1412.6980, 2014.

Lassner, Christoph et al., A generative model of people in clothing. arXiv preprint arXiv:1705.04098, 2017.

Lin, Tsung-Yi et al., Microsoft COCO: Common objects in context. Proc. of European on Computer Vision, (ECCV), pp. 740-755, 2014.

Lu, Fang et al., Automatic 3D liver location and segmentation via convolutional neural network and graph cut. International Journal of Computer Radiology and Surgery, 12(2):171-182, 2017.

Ma, Liqian et al., Pose guided person image generation. Advances in Neural Information Processing Systems, NIPS, pp. 405-415, 2017.

Okada, Toshiyuki et al., Abdominal multi-organ segmentation from CT images using conditional shape-location and unsupervised intensity priors. Medical Image Analysis, 26(1): 1-18, 2015.

Oliveira, Bruno et al., A novel multi-atlas strategy with dense deformation field reconstruction for abdominal and thoracic multi-organ segmentation from computed tomography. Medical Image Analysis, 45:108-120, 2018.

Rebuffi, Sylvestre-Alvise et al., Learning multiple visual domains with residual adapters. Advances in Neural Information Processing Systems, NIPS, pp. 506-516, 2017.

Reed, Scott E. et al., Zeynep Akata, Santosh Mohan, Samuel Tenka, Bernt Schiele, and Honglak Lee. Learning what and where to draw. Advances in Neural information Processing Systems, NIPS, pp. 217-225, 2016.

Holger R Roth et al., Deeporgan: Multi-level deep convolutional networks for automated pancreas segmentation. Proc. of International Conference on Medical Image Computing and Computer-Assisted Intervention, (MICCAI), pp. 556-564, 2015.

Holger R Roth, et al., Hierarchical 3D fully convolutional networks for multi-organ segmentation. arXiv preprint arXiv:1704.06382, 2017.

Aaron van den Oord et al., Conditional image generation with pixelcnn decoders. Advances in Neural Information Processing Systems, NIPS, pp. 4790-4798, 2016.

Robin Wolz et al., Multi-organ abdominal CT segmentation using hierarchically weighted subject-specific atlases. Proc. of International Conference on Medical Image Computing and Computer-Assisted Intervention (MICCAI), pp. 10-17, 2012.

(56) References Cited

OTHER PUBLICATIONS

Tianfan Xue et al, Visual dynamics: Probabilistic future frame synthesis via cross convolutional networks. Advances in Neural Information Processing Systems, NIPS, pp. 91-99, 2016.

Xinchen Yan et al., Attribute2image: Conditional image generation from visual attributes. Proc. of European Conference on Computer Vision, (ECCV), pp. 776-791, 2016.

Dong Yang et al., Automatic liver segmentation using an adversarial image-to-image network. International Conference on Medical Image Computing and Computer-Assisted Intervention, (MICCAI), pp. 507-515, 2017.

Yuyin Zhou et al., A fixed-point model for pancreas segmentation in abdominal CT scans. International Conference on Medical Image Computing and Computer-Assisted Intervention, (MICCAI), pp. 693-701, 2017.

Jun-Yan Zhu et al., Toward multimodal image-to-image translation. Advances in Neural Information Processing Systems, NIPS, pp. 465-476, 2017.

\* cited by examiner

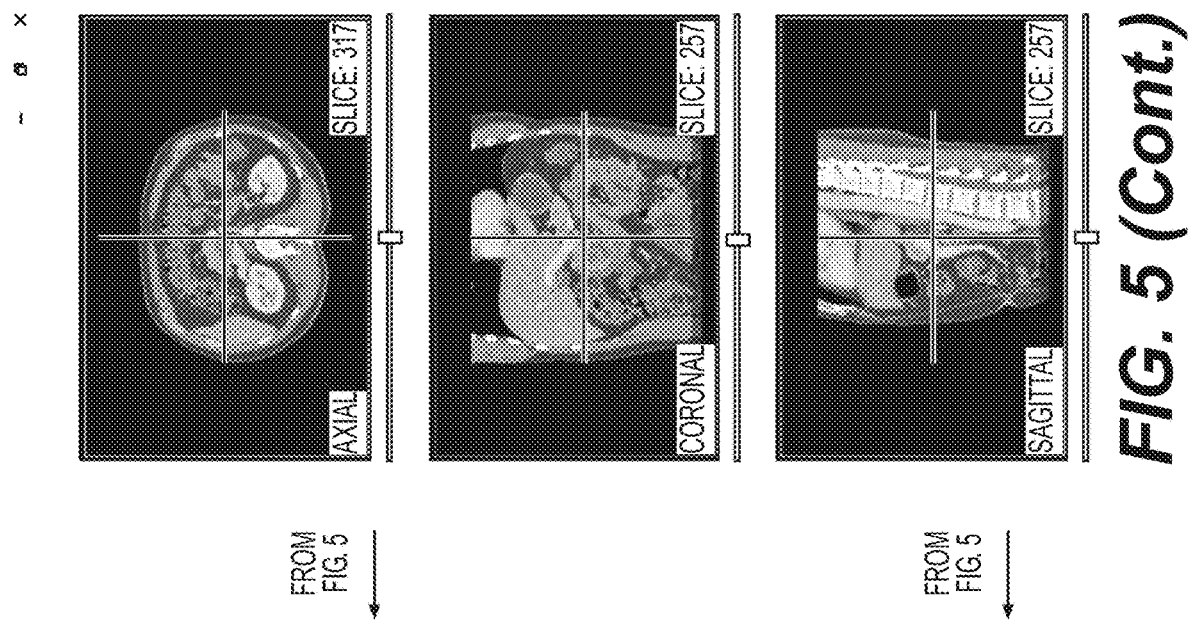

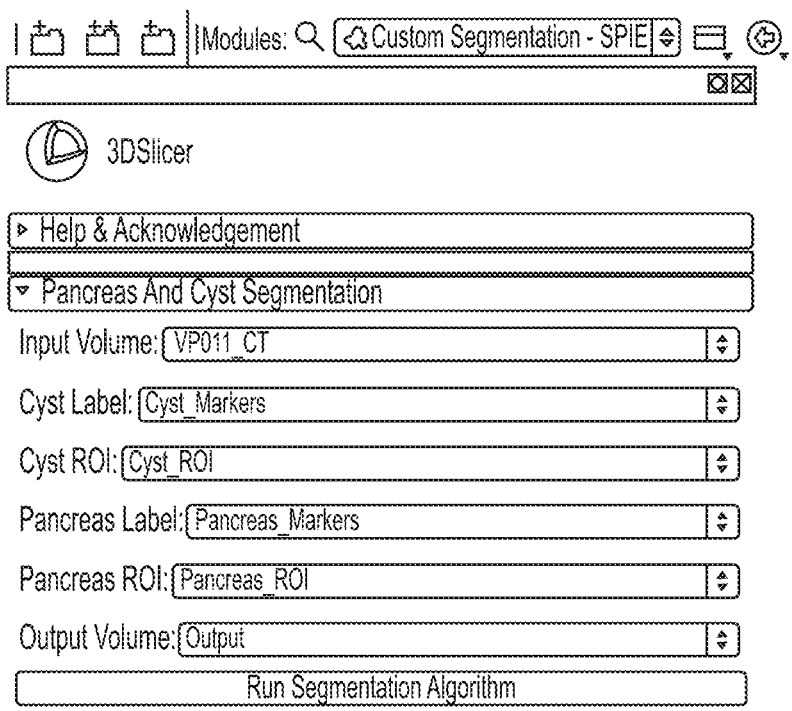
TO FIG. 6
(CONT.)
TO FIG. 6
(CONT.)
FIG. 6

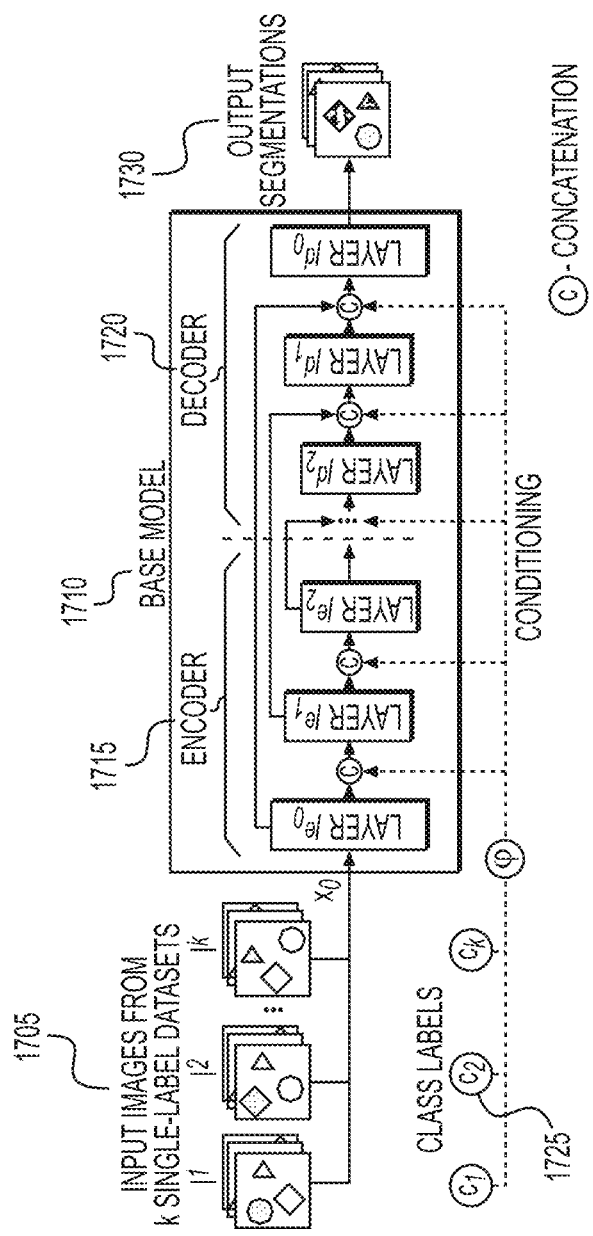
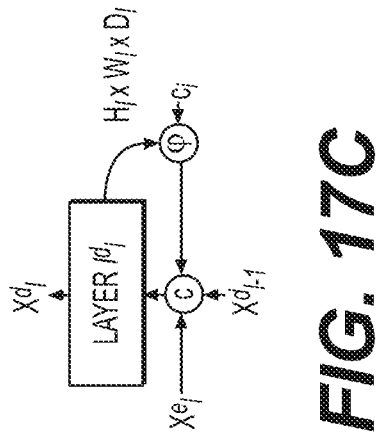
FIG. 17A
FIG. 17B
FIG. 17C

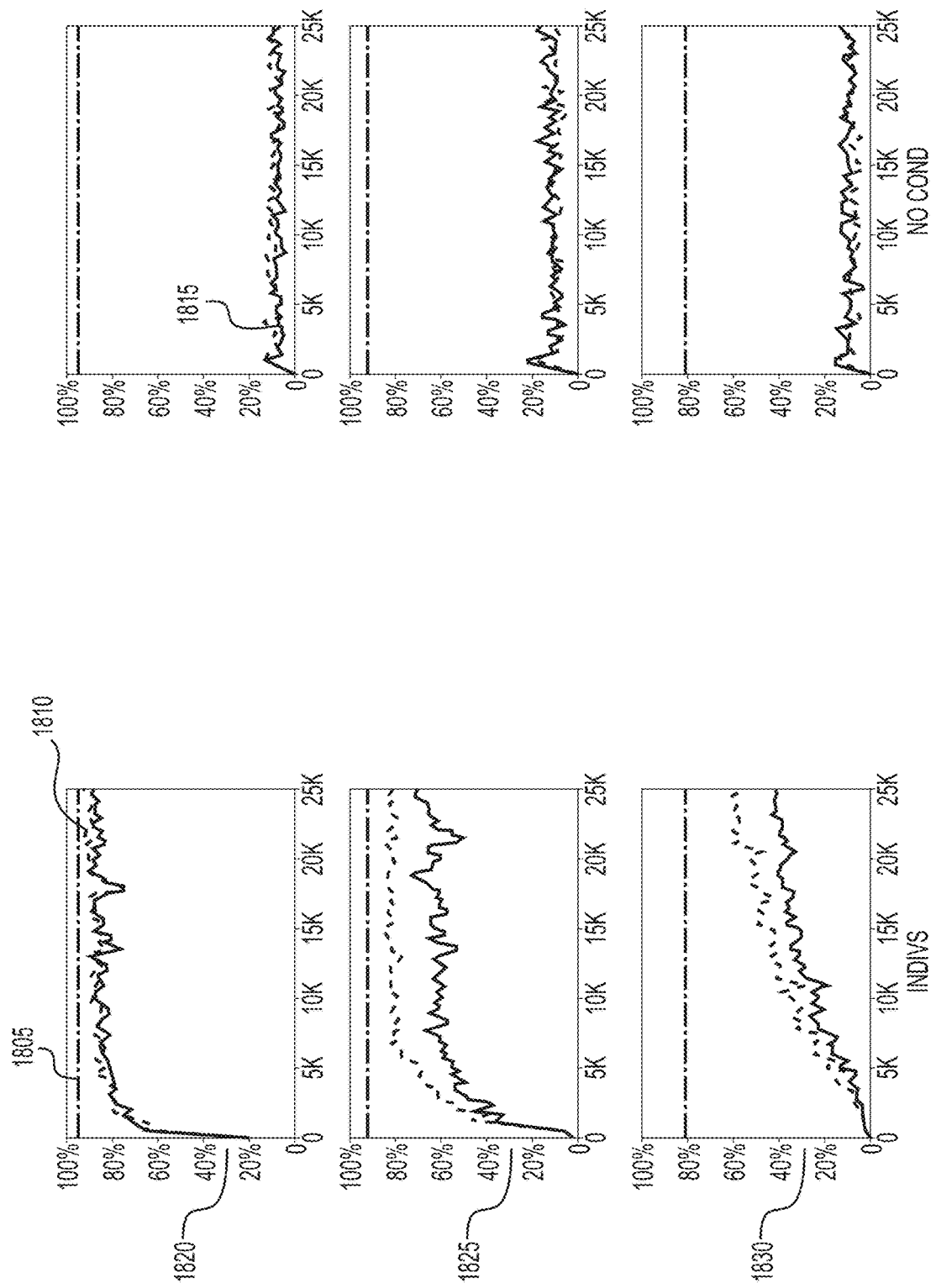
FIG. 18A / FIG. 18B

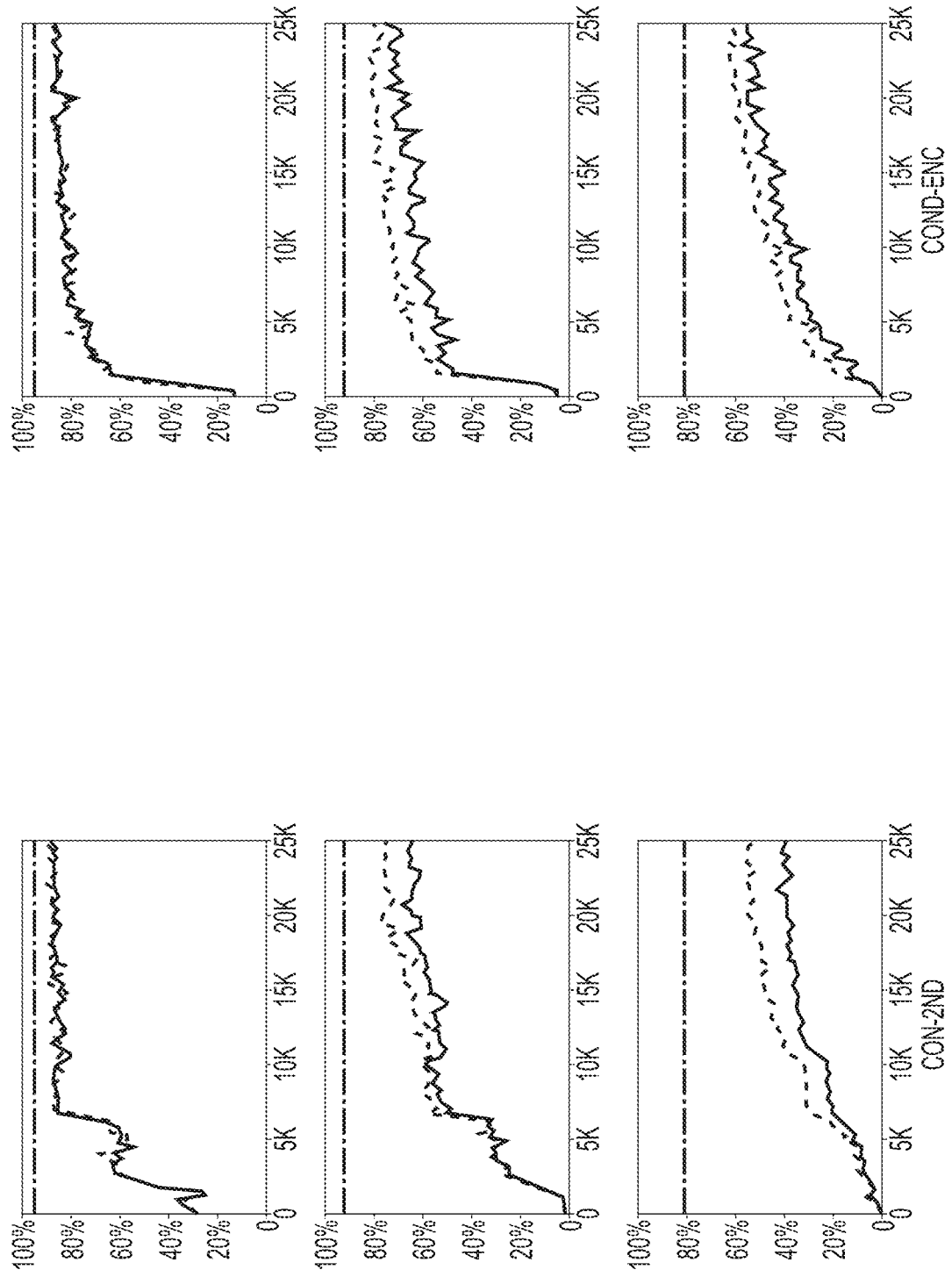

SYSTEM, METHOD, AND COMPUTER-ACCESSIBLE MEDIUM FOR VIRTUAL PANCREATOGRAPHY

CROSS REFERENCE TO RELATED APPLICATION(S)

The present application relates to and claims priority from International Patent Application No. PCT/US2018/039391 filed Jun. 26, 2018 which published as International Publication No. WO 2019/005722 on Jan. 3, 2019, and from U.S. Provisional Patent Application No. 62/524,819, filed on Jun. 26, 2017, the entire disclosures of which are incorporated herein by reference.

STATEMENT REGARDING FEDERALLY SPONSORED RESEARCH

This invention was made with government support under Grant Nos. CNS-0959979, IIP 1069147, and CNS-1302246, awarded by the National Science Foundation. The government has certain rights in the invention.

FIELD OF THE DISCLOSURE

The present disclosure relates generally to medical imaging, and more specifically, to exemplary embodiments of an exemplary system, method, and computer-accessible medium for virtual pancreatography.

BACKGROUND INFORMATION

Pancreatic cancer, or pancreatic ductal adenocarcinoma ("PDAC") as it can be formally known, can be one of the most lethal of all cancers with an extremely poor prognosis and an overall five-year survival rate of less than 9%. There are no specific early symptoms of this disease, and most of the cases are diagnosed at an advanced stage after the cancer has spread beyond the pancreas.

Early detection of the precursors of PDAC could offer the opportunity to prevent the development of invasive PDAC. Two of the three precursors of PDAC, intraductal papillary mucinous neoplasms ("IPMNs") and mucinous cystic neoplasms ("MCNs"), form pancreatic cystic lesions. These cystic lesions can be common and easy to detect with currently available imaging modalities such as computed tomography ("CT") and magnetic resonance imaging ("MRI"). IPMNs and MCNs can be relatively easily identified and offer the potential for the early identification of PDAC. However, the issue can be complicated because there are many other types of pancreatic cystic lesions. These range from entirely benign, or non-cancerous cysts, such as serous cystadenomas ("SCAs"), which do not require surgical intervention, to solid-pseudopapillary neoplasms ("SPNs"), which can be malignant and should undergo surgical resection. These issues highlight the importance of correctly identifying the type of cyst to ensure appropriate management. (See, e.g., Reference 1).

The majority of pancreatic cystic lesions can be discovered incidentally on CT scans, which makes CT the first available source of imaging data for diagnosis. A combination of CT imaging findings in addition to general demographic characteristics, such as patient age and gender, can be used to discriminate different types of pancreatic cystic lesions. (See, e.g., Reference 1). However, correctly identifying cystic lesion type by manual examination of the radiological images of pancreatic cystic lesions can be challenging, even for an experienced radiologist. A recent study (see, e.g., Reference 2) reported an accuracy of 67-70% for the discrimination of 130 pancreatic cystic lesions on CT scans performed by two readers with more than ten years of experience in abdominal imaging.

The use of a computer-aided diagnosis ("CAD") procedure may not only assist the radiologist, but also ameliorate the reliability and objectivity of differentiation of various pancreatic cystic lesions identified in CT scans. Although many procedures have been proposed for the non-invasive analysis of benign and malignant masses in various organs, there are no CAD procedures for classifying pancreatic cystic lesion type.

Thus, it may be beneficial to provide an exemplary system, method, and computer-accessible medium for virtual pancreatography which can overcome at least some of the deficiencies described herein above.

SUMMARY OF EXEMPLARY EMBODIMENTS

A system, method, and computer-accessible medium for using medical imaging data to screen for a cyst(s) (e.g., for segmentation and visualization of a cystic lesion) can include, for example, receiving first imaging information for an organ(s) of a one patient(s), generating second imaging information by performing a segmentation operation on the first imaging information to identify a plurality of tissue types, including a tissue type(s) indicative of the cyst(s), identifying the cyst(s) in the second imaging information, and applying a first classifier and a second classifier to the cyst(s) to classify the cyst(s) into one or more of a plurality of cystic lesion types. The first classifier can be a Random Forest classifier and the second classifier can be a convolutional neural network classifier. The convolutional neural network can include at least 6 convolutional layers, where the at least 6 convolutional layers can include a max-pooling layer(s), a dropout layer(s), and fully-connected layer(s).

In some exemplary embodiments of the present disclosure, the max-pooling layer(s) can include 3 max-pooling layers, the dropout layer(s) can include 2 dropout layers, and the fully-connected layer(s) can include 3 fully-connected layers. The 3 fully-connected layers can include the 2 dropout layers. The second imaging information can be generated by segmenting the first imaging information into a foreground and a background for use in visualizing the cystic lesion. The foreground can include a pancreas gland and the background can include a plurality of further cystic lesions. The second information can be generated by generating a plurality of segmentation outlines for the foreground and the background which can be used to visualize the cystic lesion. The first classifier can be applied by analyzing a characteristic(s) for the patient(s), where the characteristic(s) can include (i) an age of the patient(s), (ii) a gender of the patient(s), (iii) a location of the cyst(s) in a pancreas gland, (iv) a shape of the cyst(s), or (iv) an intensity characteristic of the cyst(s).

In certain exemplary embodiments of the present disclosure, the characteristic(s) can be generated based on the segmentation outlines or intensity characteristics of the foreground. The segmentation operation can be an automated segmentation procedure. The second imaging information can be generated by displaying the first imaging information to a user(s) (e.g., for visualization), and segmenting the first imaging information based on input received from the user(s). The first classifier can be applied to the cyst(s) to generate a first set of class probabilities, and the second classifier can be applied to the cyst(s) to generate a second set of class probabilities. The cyst(s) can be classified by applying a Bayesian combination to the first set of class probabilities and the second set of class probabilities.

In some exemplary embodiments of the present disclosure, the cyst(s) can be classified as (i) a intraductal papillary mucinous neoplasm, (ii) a mucinous cystic neoplasm, (iii) a serous cystadenoma or (iv) a solid-pseudopapillary neoplasm. The classification can include a probability that the cyst(s) can be (i) the intraductal papillary mucinous neoplasm, (ii) the mucinous cystic neoplasm, (iii) the serous cystadenoma or (iv) the solid-pseudopapillary neoplasm. The cyst(s) can be located in a pancreas of the patient(s). The first imaging information can include magnetic resonance imaging information or computed tomography imaging information. The magnetic resonance imaging information and the computed tomography imaging information can be segments using a segmentation procedure for visualization by a doctor. The segmented cystic lesion can also be classified using one or more classifiers.

Further, an exemplary system, method and computer-accessible medium for multi-label segmentation of an anatomical structure(s) can include receiving first imaging information related to a plurality of single-label datasets for the anatomical structure(s), receiving second information related to a plurality of class labels for the anatomical structure(s), generating third information by encoding the second information based on the first imaging information using a convolutional neural network (CNN), generating fourth information by decoding the third information using the CNN, segmenting the anatomical structure(s) based on the fourth information.

In some exemplary embodiments of the present disclosure, the third information can be generated using a plurality of encoding layers and the fourth information can be generated using a plurality of decoding layers. The third information can be generated by concatenating feature maps for one of the encoding layers based on a previous one of the encoding layers and the fourth information can be generated by concatenating feature maps for one of the a decoding layers based on a previous one of the decoding layers. The encoding layers can include a convolutional layer(s) and at least three maxpooling layers. The encoding layers can include a particular number of feature channels in each dense block that are proportional to a depth of each dense block.

In certain exemplary embodiments of the present disclosure, the fourth information can be generated using a plurality of transposed convolutions having strides as upsampling layers that are topologically symmetric to the encoding layers. One of the decoding layers can include a sigmoid function. The anatomical structure(s) can be an abdominal organ(s). The encoding layers or the decoding layers can be conditioned, for example, using a segmented target label.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 6 is a further image of the exemplary visualization interface according to an exemplary embodiment of the present disclosure;

FIG. 17A is a schematic diagram of an exemplary convolutional neural network according to an exemplary embodiment of the present disclosure;

FIG. 17B is a diagram of conditioning that can be performed for an encoder according to an exemplary embodiment of the present disclosure;

FIG. 17C is a diagram of conditioning that can be performed for a decoder according to an exemplary embodiment of the present disclosure;

FIGS. 18A-18E are graphs of learning curves for various exemplary models according to an exemplary embodiment of the present disclosure;

Figure 1:
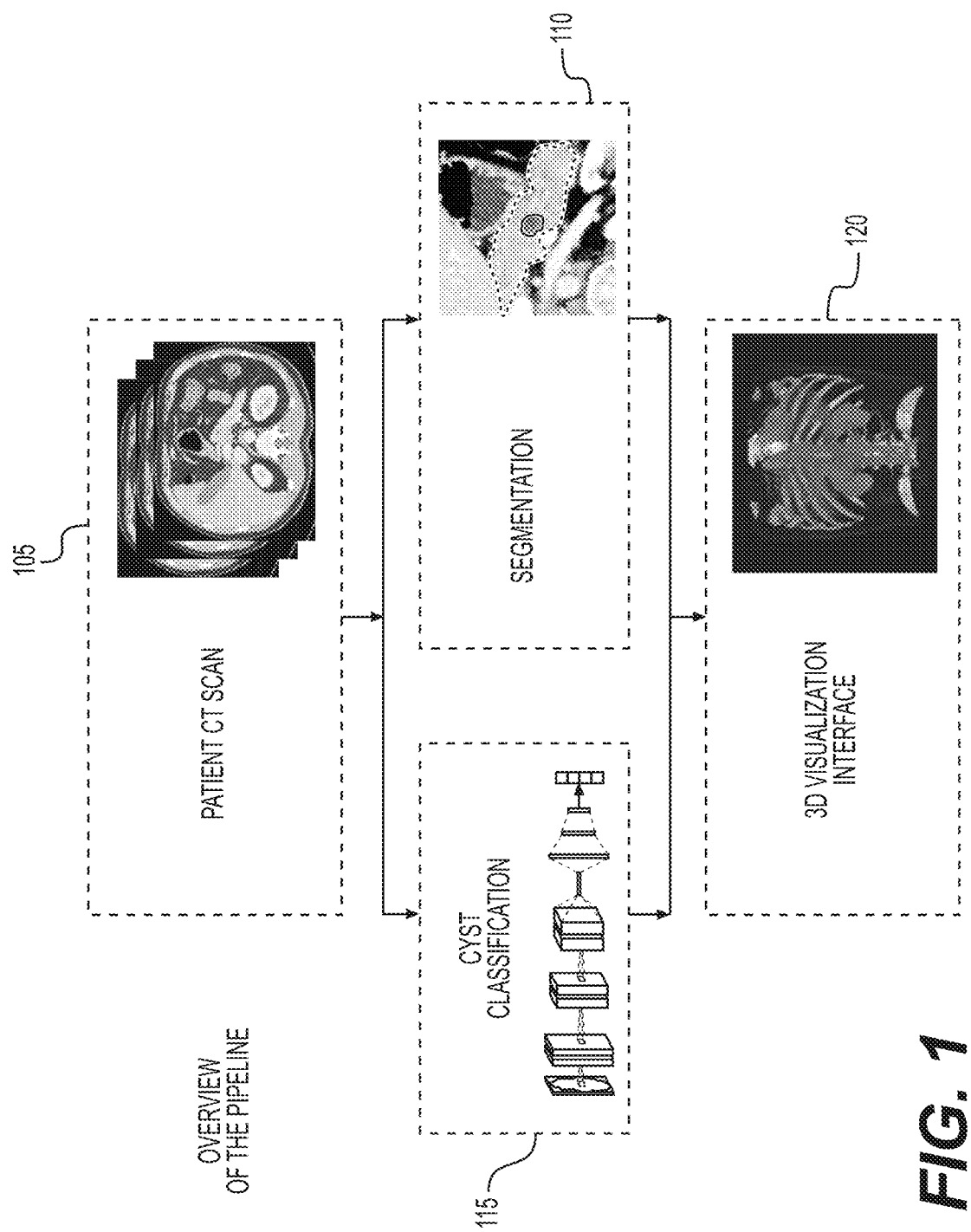
FIG. 1 is an exemplary method for generating an image used in the exemplary visualization system according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Embodiments of the invention described herein provide an exemplary system, method, and computer-accessible medium for virtual pancreatography ("VP"). The exemplary system, method, and computer-accessible medium can include software tools for non-invasive radiological evaluation of pancreatic cystic lesions from abdominal scans, such as computed tomography ("CT") or magnetic resonance imaging ("MRI"). Physician-guided or automatic segmentation of the pancreas gland and pancreatic cystic lesions can be provided, including automatic image analysis of the segmented pancreatic cystic lesions for the histopathological classification into cystic lesions types (e.g., intraductal papillary mucinous neoplasm, mucinous cystic neoplasm, serous cystadenoma, and solid-pseudopapillary neoplasm) and a comprehensive visualization interface with a 3D rendering and measuring capabilities.

The exemplary system, method, and computer-accessible medium can assist physicians, for example, typically a radiologist, to improve the accuracy of the diagnosis and to ameliorate the objectivity of the differentiation of various pancreatic cystic lesions identified in a radiological scan, such as CT or MRI. The exemplary system, method, and computer-accessible medium can support early detection of pancreatic cystic lesions, which can substantially change the survival rates for pancreatic cancer.

FIG. 1 shows an exemplary method 100 for generating an image used in the exemplary classification and visualization system according to an exemplary embodiment of the present disclosure. For example, at procedure 105, a patient scan (e.g., a CT scan or MRI scan of a patient) can be received. At procedure 110, an automated or semi-automated segmentation procedure can be performed on the patient scan to identify various regions of tissue types, such as organs and potential cystic lesions. At procedure 115, a cystic lesion classification procedure can be performed on the segmented patient scan to classify potential cystic lesions into one of a plurality of cystic lesion types. At procedure 120, the results of procedures 110 and 115 can be input into the 3D visualization interface for viewing by, for example, a radiologist.

The exemplary system, method, and computer-accessible medium can include pancreas and cystic lesion segmentation. Specifically, the VP system can include a module to perform a physician/technician-guided or automatic segmentation of the pancreas gland, cystic lesions and ducts. The physician-guided module can include a graphical user interface with tools for bounding box placement to parameterize a region of interest and a "brush" or "marker" tool to draw stokes on representative areas of the foreground (pancreas gland and cystic lesions) and background. The module can use this information, and the original scan images, to generate a rough segmentation outlines, which can then be refined by a random walker procedure to create the final segmentation boundary between foreground and background elements.

Figure 2B:
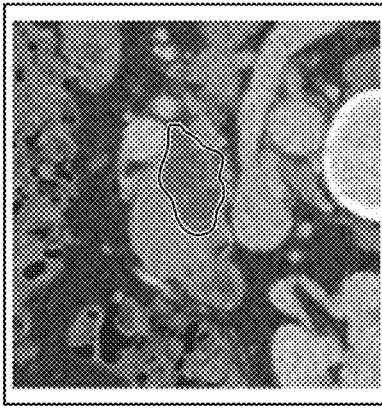
FIGS. 2A-2D are images showing the location of the cystic lesion within the pancreas according to an exemplary embodiment of the present disclosure.
Figure 2D:
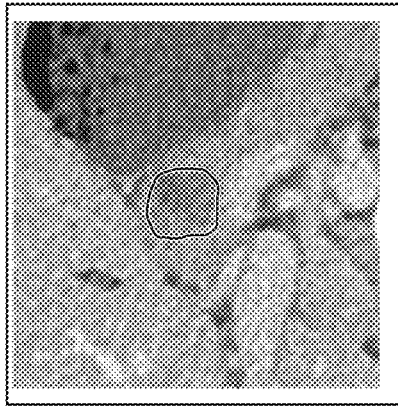
Figure 2A:
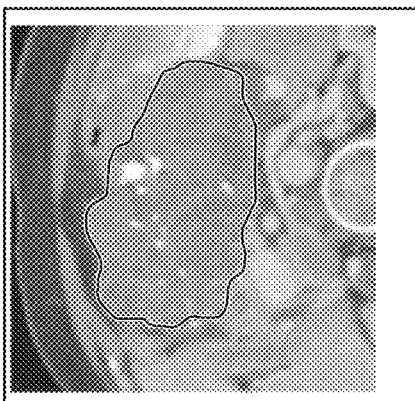
Figure 2C:
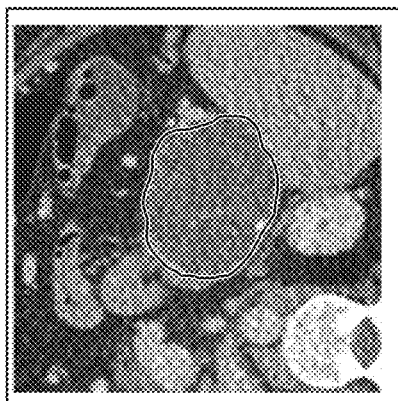

The exemplary system, method, and computer-accessible medium can include cystic lesion classification. The most common features used by the radiologist for the discrimination of pancreatic cystic lesions include gender and age of a patient, as well as location of the cystic lesion within the pancreas, shape, and general appearance of the cystic lesion. (See e.g., FIGS. 2A-2D). For example, MCN (see e.g., FIG. 2C and FIG. 3, element 315) and SPN (see e.g., FIG. 2D and FIG. 3 element 320) are often present in women of premenopausal age, while IPMNs (see e.g., FIG. 2B and FIG. 3 element 310) have an equal distribution between men and women and typically present in patients in their late 60s. The vast majority of MCNs and SPNs arise in the body or tail of the pancreas, while other types do not show such predisposition. The exemplary system, method, and computer-accessible medium, can utilize all these features to produce final probabilities of the presence of MCNs and SPNs. The exemplary CNN can be used for the simultaneous automatic segmentation of the pancreatic gland and cystic lesions and the histopathological classification of the cystic lesions. Radiological features and spatial information from the CT scan can be used, and the relationship between the histopathological type of the cystic lesion and its location within the pancreas gland, its shape, and its radiological appearance can be encoded.

Figure 4:
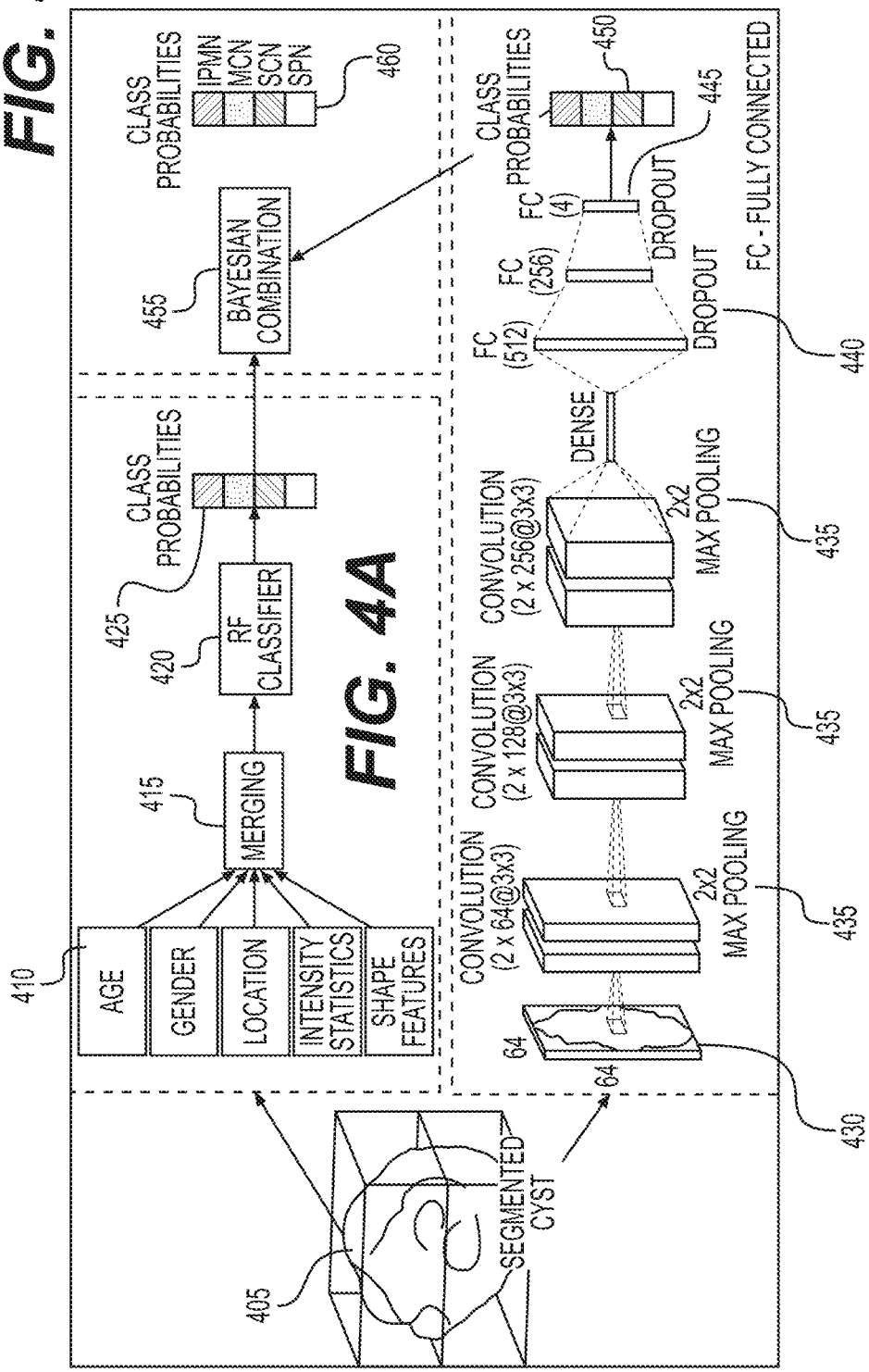
FIG. 4A-4C are schematic views of a classification procedure according to an exemplary embodiment of the present disclosure.

As illustrated in FIG. 4A, the classification module of the VP system can use the outlines of the pancreatic cystic lesions, the original imaging scan, and age and gender of a patient to perform an automatic histopathological analysis. The classification module can include: (i) a probabilistic random forest classifier 420, which can analyze factors 410 such as the age and gender of a patient, location of the cystic lesion within the pancreas gland, its shape and intensity characteristics, derived from the outlines and the intensities of the scan and (ii) a convolutional neural network, exemplified in FIG. 4B, which can analyze high-level imaging characteristics of the cystic lesion. Referring to FIG. 4C, these two modules can be combined into a Bayesian combination 455 to encode the relationship between the four most common pancreatic cystic lesion types and the characteristics of the cystic lesion, to thus can produce the final probabilities 460 of the cystic lesion to be of a particular type.

Figure 5:
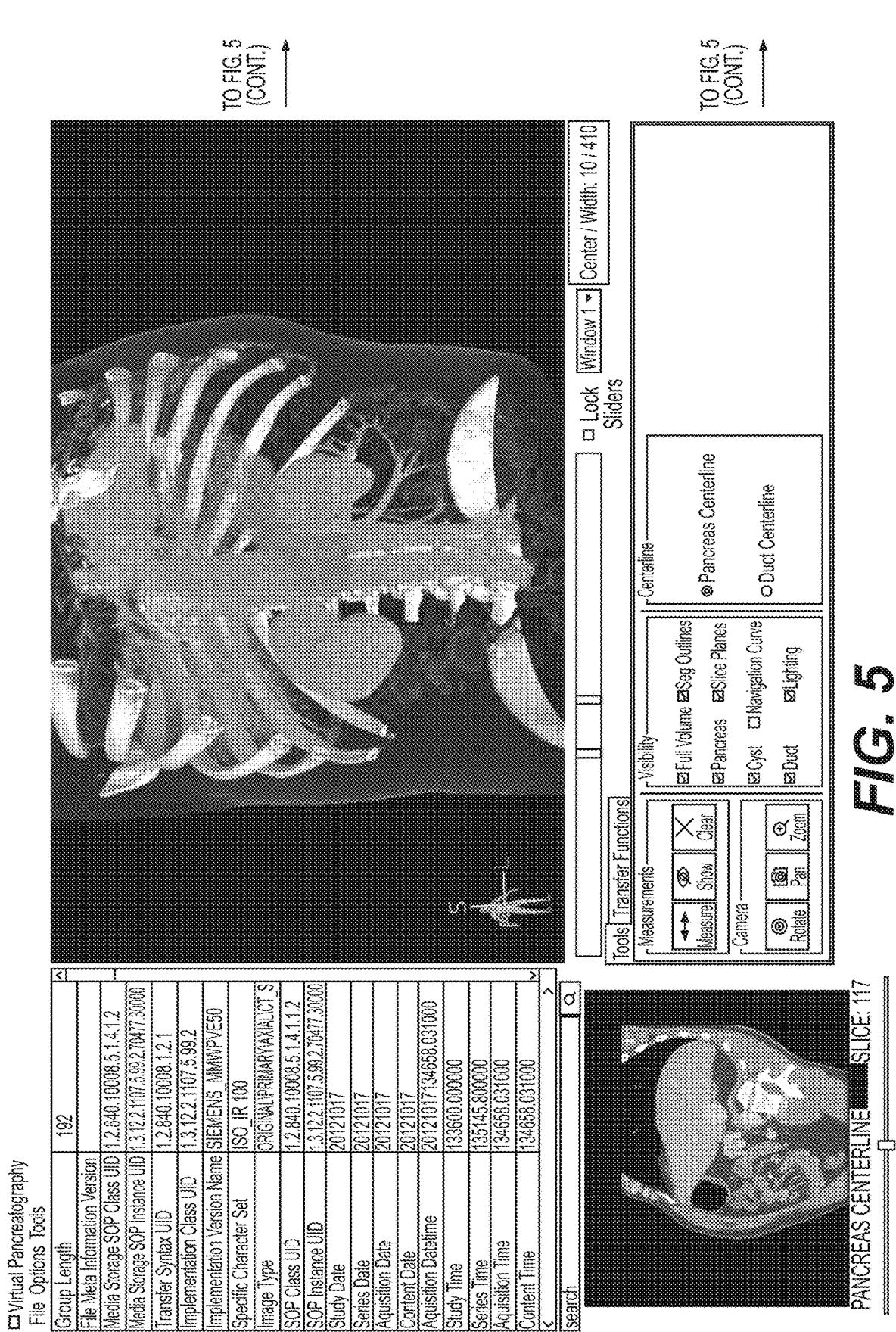
FIG. 5 is an image of an exemplary visualization interface according to an exemplary embodiment of the present disclosure.

The exemplary system, method, and computer-accessible medium can include a visualization interface, an example of which is depicted in FIGS. 5 and 6. The visualization module of the VP system can provide tools for 2D visualization of the original scan images with an optional overlay of the segmentation outlines, for the general and pancreas/cystic lesion specific 3D volume rendering and measurements. Additionally, this module can be configured to reconstruct the original 2D slices orthogonal to the centerline of the pancreas or to the pancreatic duct. This can provide additional insights into the internal architecture of the cystic lesion and in understanding the cystic lesion/pancreas relationship. The measurement tools can include manual distance, measurements as well as the volume and the maximum extents of the cystic lesion. The results of the histopathological classification are shown in the designated window in the visualization interface.

Segmentation is a component in medical systems supporting visualization and diagnosis. In traditional clinical practice, if segmentation is needed, it is generally performed manually by the clinicians or technicians. However, manual segmentation can be time-consuming, laborious, and operator-dependent. The high intra- and inter-operator variability of the resulting delineations makes the segmentation process less precise and unreproducible. In contrast to manual segmentation, the exemplary system, method, and computer-accessible medium, can either semi-automatically segment an image or automatically segment an image without any user input. A Convolutional Neural Network ("CNN"), can be used, which in a wide range of medical applications, including the segmentation of various organs. The exemplary CNN can be trained and evaluated, for example, for the automatic segmentation of the pancreas gland and cystic lesions, which can analyze fine textural and spatial information on the CT scan data to produce the output. This analyzed information can also be used for the cystic lesion histopathological classification.

Exemplary Data Acquisitions

An exemplary dataset was used that contained 134 abdominal contrast-enhanced CT scans collected with a Siemens SOMATOM scanner (e.g., Siemens Medical Solutions, Malvern, Pa.). The dataset consists of the four most common pancreatic cystic lesions: 74 cases of IPMNs, 14 cases of MCNs, 29 cases of SCAs, and 17 cases of SPNs. All CT images have 0.75 mm slice thickness. The ages of the subjects (e.g., 43 males, 91 females) range from 19 to 89 years (e.g., mean age 59.9±17.4 years).

A further exemplary dataset included 319 pancreas CT datasets (e.g., 310 with various cystic lesions and 9 healthy patients). Of these, 182 cases included manual segmentations. The number of known cystic lesion types and unlabeled datasets, along with the corresponding number of manual segmentations, are shown in Table 1 below.

TABLE 1

Patient data distribution by cystic lesion type.

| | Number of Cases | Number of Manual Segmentations |
|---|---|---|
| Normal Pancreas | 9 | 9 |
| Intraductal Papillary Mucinous Neoplasms (IPMN) | 93 | 81 |
| Serous Cystadenoma (SCA) | 33 | 27 |
| Mucinous Cystic Neoplasm (MCN) | 23 | 11 |
| Solid-Pseudopapillary Neoplasm (SPN) | 17 | 14 |
| Other (Pseudocysts, PNET, etc.) | 16 | 10 |
| Unlabeled datasets (for validation) | 30 | 30 |
| Unlabeled datasets (for classification algorithm refinement) | 98 | 0 |
| Total | 319 | 182 |

Figure 3:
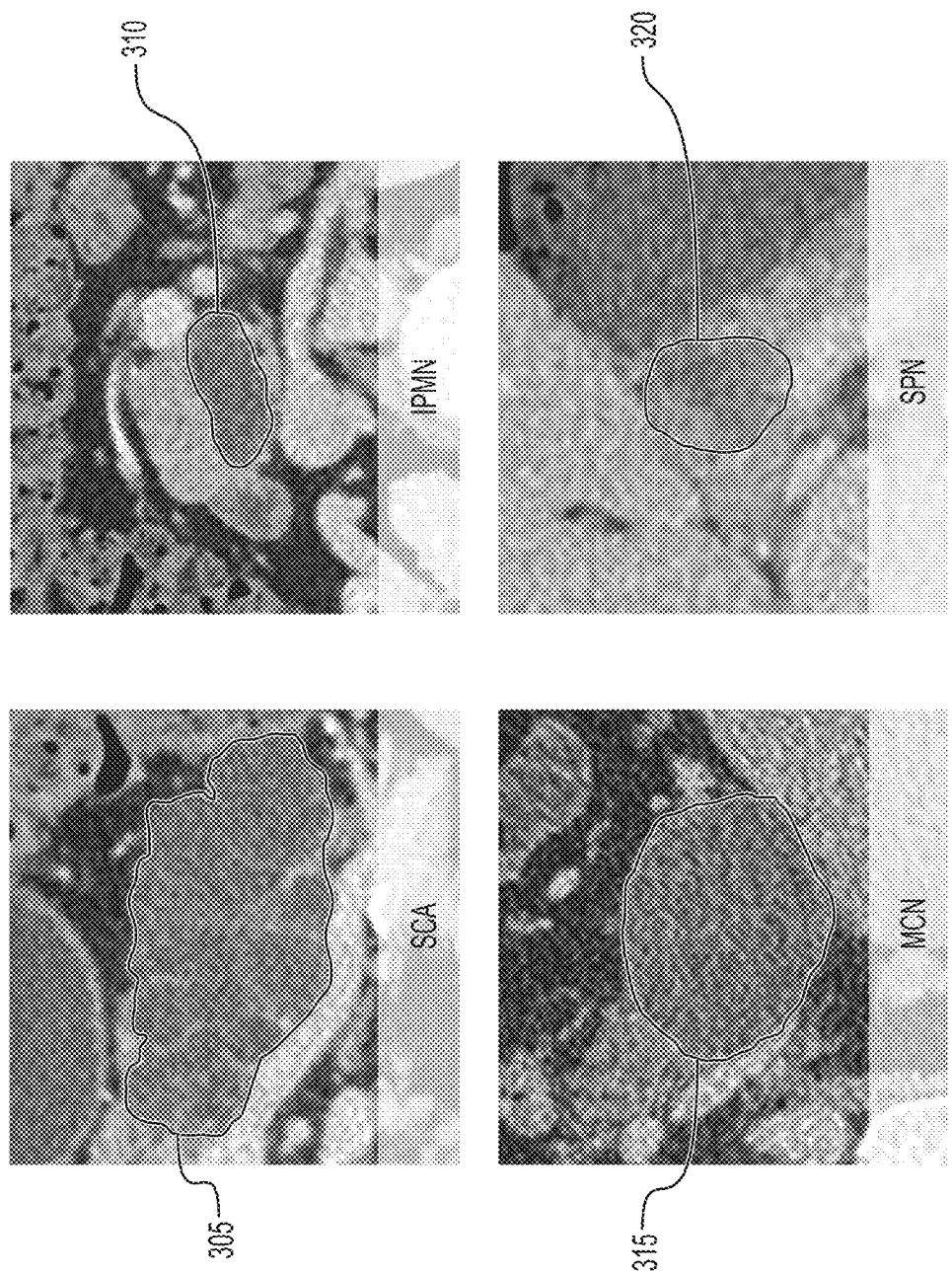
FIG. 3 is a set of images illustrating the outlines of cystic lesions according to an exemplary embodiment of the present disclosure.

An important aspect of the computer-aided cystic lesion analysis can be segmentation. The effectiveness and the robustness of the exemplary classification procedure can depend, in part, on the precision of the segmentation outlines. Referring to FIG. 3, the outlines of various cystic lesions were obtained by a semi-automated graph-based segmentation procedure (see, e.g., Reference 3), and were confirmed by an experienced radiologist as SCA 305, IPMN 310, MCN 315, and SPN 320. The histopathological diagnosis for each subject was confirmed by a pancreatic pathologist based on the subsequently resected specimen. The segmentation procedure was followed by a denoising procedure using the state-of-the-art BM4D enhancement filter. (See, e.g., Reference 4).

Exemplary Method

The exemplary system, method, and computer-accessible medium can provide an accurate histopathological differentiation for pancreatic cystic lesions. FIGS. 4A-4C show a schematic of the exemplary classification procedure according to an exemplary embodiment of the present disclosure. This exemplary model can include: (i) a probabilistic random forest ("RF") classifier 420, which can be used to analyze manually selected quantitative features, and (ii) a convolutional neural network ("CNN") 435 trained to discover high-level imaging features for a better differentiation.

For example, FIG. 4A shows a random forest classifier trained to classify vectors of quantitative features 410 from a segmented cystic lesion 405. Quantitative features 410 can include, but are not limited to, Age, Gender, Location, Intensity Statistics, and Shape Features. Quantitative features 410 can be merged 415, and input into RF classifier 420 in order to produce class probabilities 425. The exemplary CNN architecture is shown in FIG. 4B. Segmented cystic lesion 405 can be resized into a 64 pixel by 64 pixel image 430. Six (6) Convolutional layers are shown in FIG. 4B (e.g., 3 Max-pooling layers 435 and 3 Fully-connected ("FC") layers 445, two of which can be dropout layers 440, which can all be used to produce class probabilities 450. As shown in FIG. 4C, class probabilities 425 from FIG. 4A and class probabilities 450 from FIG. 4B can form a Bayesian combination 455, which can be used to generate class probabilities 460. Class probabilities in the context of a VP system may include, for example, IPMN, MCN, SCN, and SPN.

The exemplary system, method, and computer-accessible medium can utilize the general demographic information of a patient as well as the CT imagery of the cystic lesion. It can be based on a Bayesian combination 455 of the RF classifier 420, which can learn subclass-specific demographic (e.g., age and gender), location (e.g., head, body, and tail), intensity, and shape features of a cystic lesion; and a CNN that can utilize fine texture information.

Based on the size of the dataset the RF and CNN can be utilized as two separate classifiers. Alternatively, the RF and CNN can be used in a single classifier. Using the RF and CNN as two separate classifiers can be advantageous because the RF classifier can show better performance in classifying small cystic lesions, which do not have distinctive imaging features, by utilizing patient demographic information, and the CNN can show similar performance in analyzing large cystic lesions. After training RF and CNN classifiers independently, a Bayesian combination was performed to ensure that a more robust and accurate classifier had more power in making the final decision.

The performance of the developed classification procedure was tested using a stratified 10-fold cross-validation strategy on 134 datasets, maintaining a similar data distribution in training and testing datasets to avoid possible over- and under-representation of cystic lesion classes. The classification accuracy for each cystic lesion type is summarized in Table 2 below.

TABLE 2

Cystic lesion classification accuracy of
the automatic cystic lesion classifier.

| Cystic lesion Type | Accuracy |
| --- | --- |
| IPMN | 96.0% |
| MCN | 64.3% |
| SCA | 51.7% |
| SPN | 100.0% |
| All Types | 83.6% |

Exemplary Quantitative Features and Random Forest

The most common features discussed in the medical literature that can be used for initial pancreatic cystic lesion differentiation involve gender and age of the subject, as well as location, shape and general appearance of the cystic lesion. (See, e.g., Reference 2). A set Q of 14 quantitative features can be defined to describe particular cases by: (i) age a∈Q and gender g∈Q of the patient, (ii) cystic lesion location l∈Q, (iii) intensity I⊂Q and (iv) shape $\mathcal{S}$⊂Q features of a cystic lesion. The importance and discriminative power of these features are described below.

1. Age and Gender. Several studies reported a strong correlation between age and gender of a patient and certain types of pancreatic cystic lesions. (See, e.g., References 1 and 5). For example, MCN and SPN often present in women of premenopausal age. In contrast, IPMNs have an equal distribution between men and women, and typically present in patients in their late 60s.
2. Cystic lesion location. Certain cystic lesion types can be found in particular locations within the pancreas. For example, the vast majority of MCNs arise in the body or tail of the pancreas.
3. Intensity features. Due to the differences in the fine structure of pancreatic cystic lesions, such as homogeneity versus common presence of septation, calcification or solid component, the set $\{\bar{I}, s, k, \gamma, M\} \in I$ can be used, which can be the mean, standard deviation, kurtosis, skewness and median of intensities, respectively, as the global intensity features for coarse initial differentiation.
4. Shape features. Pancreatic cystic lesions can also demonstrate differences in shape depending on the category. Specifically, cystic lesions can be grouped into three categories: smoothly shaped, lobulated and pleomorphic cystic lesions. (See, e.g., Reference 5). To capture different characteristics of the shape of a cystic lesion, volume $V \in \mathcal{S}$, surface area $SA \in \mathcal{S}$, surface area-to-volume ratio $SA/V \in \mathcal{S}$, rectangularity $r \in \mathcal{S}$, convexity $c \in \mathcal{S}$ and eccentricity $c \in \mathcal{S}$ features summarized in can be used. (See, e.g., Reference 6).

Given a set $D=\{(x_1, y_1), \ldots, (x_k, y_k)\}$ of examples $x_i$ of pancreatic cystic lesions of known histopathological subtypes $y_i \in \mathcal{Y} = \{IPMN, MCN, SCA, SPN\}$, a concatenation $q_i = (a_i, g_i, l_i, \bar{I}_i, s_i, k_i, \gamma_i, M_i, V_i, S_i, SA_i, SA/V_i, r_i, c_i, e_i)$ of the described features for all k samples in the set D can be determined.

Following feature extraction, an RF classifier 420 can be used to perform the classification of a feature vector $q_m$ computed for an unseen cystic lesion sample $x_m$. RF-based classifiers have shown excellent performance in various classification tasks, including numerous medical applications, having high accuracy of prediction and computation efficiency. (See, e.g., References 7 and 8).

A forest of T decision trees can be used. Each decision tree $\theta_t$ can predict the conditional probability $P_{\theta_t}(y|q_m)$ of histopathological class y, given a feature vector $q_m$. The final RF class probability can be found as the following:

$$\hat{P}_1(y_m = y | x_m) = \hat{P}_{RF}(y_m = y | q_m) = \frac{1}{T} \sum_{t=1}^{T} P_{\theta_t}(y_m = y | q_m) \quad (1)$$

Exemplary CNN

RF trained on the proposed quantitative features can be used for pancreatic cystic lesion classification with a reasonably high accuracy. However, despite having high generalization potential, the proposed exemplary features may not take full advantage of the imaging information. In particular, due to the variations in the internal structure of the pancreatic cystic lesions, they can show different radiological characteristics: (i) SCA cystic lesions often have a honeycomb-like appearance with a central star or septation, (ii) MCN cystic lesions demonstrate a "cystic lesion within cystic lesion" appearance with peripheral calcification, (iii) IPMN cystic lesions tend to render a "cluster of grapes" like appearance, and SPN cystic lesions typically consist of solid and cystic components. (See, e.g., Reference 10). However, these radiological features can overlap for certain cystic lesion subtypes, especially when the cystic lesion can be small, and the internal architecture cannot be differentiated.

The exemplary system, method, and computer-accessible medium can utilize a CNN as a second classifier, which can be more suitable for learning barely perceptible yet important imaging features. (See, e.g., Reference 11). The exemplary CNN architecture is shown in FIG. 4B. FIG. 4B shows 6 Convolutional, 3 Max-pooling layers 435, 3 FC layers 445, two of which can be Dropout layers 440. Each convolutional and the first two FC layers can be followed by the rectified linear unit ("ReLU") activation function; the last FC layer 445 can end with the softmax activation function to obtain the final class probabilities.

The data for training and testing the exemplary CNN were generated as follows. Each two-dimensional ("2D") axial slice $X_{ij}^{Slice}$ the original 3D bounding box $\{X_{ij}^{Slice}\}$ with a segmented cystic lesion $x_i$ was resized to 64×64 pixels squares, using bicubic interpolation. Due to the generally spherical shape of a cystic lesion, slices near the top and the bottom of the volume do not contain enough pixels of a cystic lesion to make an accurate diagnosis. Therefore, slices with the overlap ratio less than 40%, which can be defined as the percentage of cystic lesion pixels in a slice, were excluded. A data augmentation routine was utilized to increase the size of the training dataset and to prevent over-fitting: (i) random rotations within [−25°; +25°] degree range; (ii) random vertical and horizontal flips; (iii) and random horizontal and vertical translations within [−2; +2] pixels range.

The network can be implemented using the Keras library and trained on 512-sized mini-batches to minimize the class-balanced cross-entropy loss function using Stochastic Gradient Descent with a 0.001 learning cate for 100 epoch. In the testing phase, each slice with the overlap ratio more than 40% was analyzed by the CNN separately, and the final vector of probabilities was obtained by averaging the class probabilities for each slice as, for example:

$$\hat{P}_2(y_m = y | x_m) = \quad (2)$$
$$\hat{P}_{CNN}(y_m = y | \{X_{ij}^{Slice}\}) = \frac{1}{J_m} \sum_{j=1}^{J_m} P_{CNN}(y_m = y | X_{mj}^{Slice}),$$

where $P_{CNN}(y_m = y | X_{mj}^{Slice})$ can be the vector of class probabilities, and $J_m$ can be the number of 2D axial slices used for the classification of cystic lesion simple $x_m$.

Although the exemplary dataset can be representative of the types of cystic lesions that arise in the population, it can contain limited information and might not include enough cases of cystic lesions of rare imaging appearance, which can be beneficial for obtaining robust CNN performance. Therefore, the RF classifier can be used to show a better performance at classifying small cystic lesions, which do not have enough distinctive imaging features, by utilizing the clinical information about the patient and the general intensity and shape features, whereas the exemplary CNN can be expected to show a similar performance but at analyzing large cystic lesions.

TABLE 3

Individual confusion matrices of the RF (e.g., left) and CNN (e.g., right) classifiers.

| Ground Truth | RF Prediction (%) | | | | Ground Truth | CNN Prediction (%) | | | |
|---|---|---|---|---|---|---|---|---|---|
| | IPMN | MCN | SCA | SPN | | IPMN | MCN | SCA | SPN |
| IPMN | 95.9 | 1.4 | 2.7 | 0.0 | IPMN | 93.2 | 4.0 | 1.4 | 1.4 |
| MCN | 21.4 | 64.3 | 14.3 | 0.0 | MCN | 57.1 | 28.6 | 14.3 | 0.0 |
| SCA | 51.7 | 3.5 | 37.9 | 6.9 | SCA | 37.9 | 0.0 | 48.3 | 13.8 |
| SPN | 5.9 | 0.0 | 0.0 | 94.1 | SPN | 0.0 | 0.0 | 0.0 | 100.0 |

It has been shown that combinations of multiple classifiers (e.g., classifier ensembles) can achieve superior performance compared to single classifier models (see, e.g., Reference 12), by learning different, (e.g., independent) classification subproblems separately. Therefore, after training RF and CNN classifiers independently, a Bayesian combination can be performed to ensure that a more robust and accurate classifier can have more power in making the final decision. Mathematically, the final histopathological diagnosis $\hat{y}$ can be written in the following way:

$$\hat{y}_m = \frac{\operatorname{argmax}}{y \in Y} \frac{\hat{P}_1(y_m = y \mid x_m)\hat{P}_2(y_m = y \mid x_m)}{\sum_{y' \in} y \prod_{c=1}^{2} \hat{P}_c(y_m = y' \mid x_m)}. \quad (3)$$

The performance of the exemplary system, method, and computer-accessible medium was evaluated using a stratified 10-fold cross-validation strategy, maintaining similar data distribution in training and testing datasets to avoid possible over- and under-representation of histopathological classes due to the imbalance in the dataset. Classification performance can be reported in terms of the normalized averaged confusion matrix and the overall classification accuracy. The dependency between the accuracy of the individual and ensemble classifiers and the average size of the misclassified cystic lesions was also analyzed.

All experiments were performed on a machine with an NVIDIA Titan X (12 GB) GPU. The training of RF and CNN classifiers took approximately 1 second and 30 minutes, respectively, during each cross-validation loop, and the test time for the final class probabilities took roughly 1 second to compute for a single sample.

Exemplary Results of the individual classifiers: The performance of the RF and CNN classifiers were compared separately, and the overall accuracy was 79.8% and 77.6%, respectively. The quantitative details are provided in Table 3. The experiments showed that the accuracy of 30 trees in RF lead to the error convergence and was sufficient to achieve the superior performance. Prior to developing the proposed set of quantitative features, the performance of the RF classifier was evaluated using only age, gender, and the location of the cystic lesion within the pancreas, as the most objective criteria used by clinicians. The overall accuracy was 62%, and adding the volume of the cystic lesion as a feature improved the classification by 2.2%. In addition, the performance advantages for the CNN were evaluated when using the data augmentation procedure. Specifically, it was found that the use of data augmentation improves the overall accuracy of the CNN by 13.2%.

TABLE 4

Confusion matrix of the final ensemble classifier.

| Ground Truth | Ensemble Prediction (%) | | | |
|---|---|---|---|---|
| | IPMN | MCN | SCA | SPN |
| IPMN | 95.9 | 1.4 | 1.4 | 1.4 |
| MCN | 14.3 | 64.3 | 21.4 | 0.0 |
| SCA | 34.5 | 3.5 | 51.7 | 10.3 |
| SPN | 0.0 | 0.0 | 0.0 | 100.0 |

One of the interesting, but also expected, outcomes can be the average size of the misclassified cystic lesions. In particular, the CNN classifier struggles to correctly interpret cystic lesions of a volume smaller than 9 cm$^3$ or 2.3 cm in diameter (e.g., average volume and diameter of misclassified cystic lesions can be 5.1 cm$^3$ and 1.3 cm, respectively), which can be reasonably challenging due to the absence of distinctive appearance. However, the accuracy of the RF does not show such dependence (e.g., average volume and diameter of misclassified cystic lesions can be 81 cm$^3$ and 5.2 cm, respectively).

Exemplary Results of the ensemble classifier. In this experiment, the effect of the Bayesian combination of the RF and CNN classifiers was tested on the performance, and the results are presented in Table 4 above. The overall accuracy can be 83.6%, which can be higher than the performance of the individual classifiers. It can also be interesting to note the change in the average volume and diameter of the misclassified cystic lesions, which can be 65 cm$^3$ and 4.8 cm for the ensemble model, respectively. These results validate the exemplary hypothesis and justify the decision to combine the RF and CNN classifiers into a Bayesian combination to consider their separate diagnoses depending on how accurate they have been at analyzing the training dataset.

Exemplary Cystic Lesion Classification Blind Study

A blind study on 61 patients with unknown cystic lesion type distribution was performed. All of the cases were first processed with a semi-automatic segmentation pipeline and then the cystic lesions were classified using the exemplary automatic classification system. The segmentation failed to segment the cystic lesion in one case due to noisy data, and thus classification results were determined for a total of 60 cases. The exemplary system, method, and computer-accessible medium predicted a total of 45 cases of IPMN, 7 of MCN, 6 of SCA, and 2 of SPN. The cases were evaluated independently and the results were compared to the automatic classification. Table 5 below shows the confusion matrix for these cases for the classifier predictions and the pathology-confirmed results (e.g., the gold standard). Analysis of the results revealed that the exemplary system, method, and computer-accessible medium can correctly classified 91.7% of all the cases. The classification accuracy for each cystic lesion type is shown in Table 6 below.

TABLE 5

Confusion matrix for the 60 blind cases for the classifier predictions and the gold standard.

|           |      | Gold |     |     |     |
|-----------|------|------|-----|-----|-----|
|           |      | IPMN | MCN | SCA | SPN |
| Predicted | IPMN | 44   | 0   | 1   | 0   |
|           | MCN  | 2    | 5   | 0   | 0   |
|           | SCA  | 2    | 0   | 4   | 0   |
|           | SPN  | 0    | 0   | 0   | 2   |

TABLE 6

Cystic lesion classification accuracy of the blind study.

| Cystic lesion Type | Accuracy |
|---|---|
| IPMN | 91.7% |
| MCN | 100.0% |
| SCA | 80.0% |
| SPN | 100.0% |
| All Types | 91.7% |

Exemplary Semi-Automatic Segmentation for Pancreas and Cystic Lesions

The exemplary system, method, and computer-accessible medium can include semi-automatic segmentation of the pancreas and cystic lesions. A combination of region growing and random walker procedures can be used. An example of a graphical user interface of the segmentation module is shown in FIG. 6. The exemplary segmentation pipeline can be summarized in the following procedures:

1. Initialization via user input, placing bounding boxes around the pancreas and cystic lesion(s) and using a brush tool to mark a few voxels of the pancreas, cyst(s), and background.
2. Image enhancement via noise reduction with median filtering and anisotropic diffusion smoothing.
3. Coarse segmentation via region growing using user-placed brush strokes.
4. Segmentation refinement via the random walker algorithm.
5. Output enhancement with a binary voting algorithm.

Figure 7C:
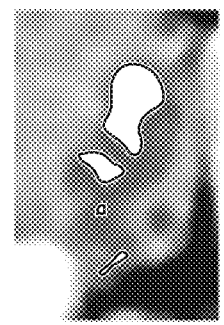
FIGS. 7A-7F are intermediate image results produce when segmenting an image according to an exemplary embodiment of the present disclosure.
Figure 7F:
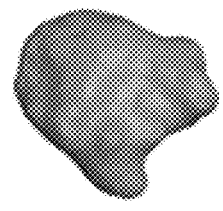
Figure 7B:
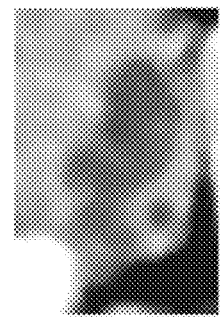
Figure 7E:
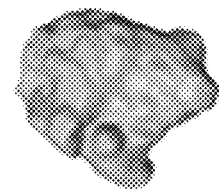
Figure 7A:
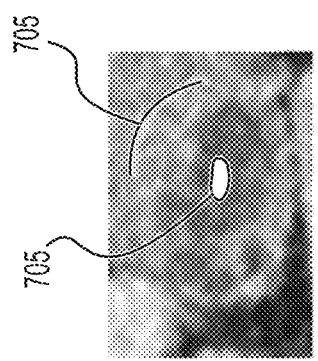
Figure 7D:
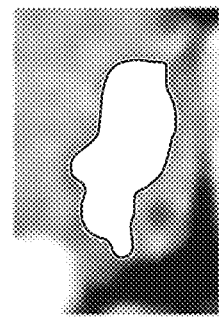
Figure 8:
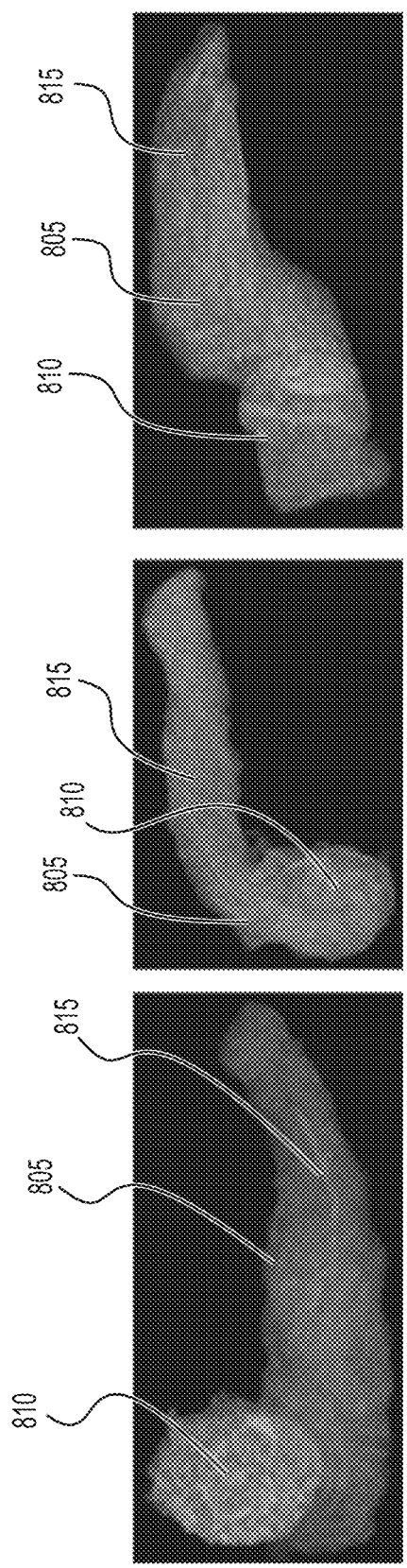
FIG. 8 is a set of segmented images according to an exemplary embodiment of the present disclosure.

FIGS. 7A-7F illustrate intermediate image results and FIG. 8 shows examples of segmentation results. For example, FIG. 7A shows a region of interest and markers 705 placed by the user. FIG. 7B shows a region of interest after smoothing. FIG. 7C shows a coarse segmentation generated by region growing. FIG. 7D shows refined segmentation generated by the random walker algorithm. FIG. 7E shows a 3D rendering of FIG. 7D, and FIG. 7F shows the final enhanced segmentation. FIG. 8 shows 3D volume rendered examples of segmentation results for the pancreas 805, cystic lesion 810, and pancreatic duct 815.

The exemplary segmentation procedure achieved 71.5±10.5% and 81.4±8.5% accuracy for pancreas and cystic lesion segmentation, respectively.

The exemplary system, method, and computer-accessible medium, can include a virtual pancreatography that can include a computer-based software system with tools that can allow a physician to examine a 3D model of the pancreas and surrounding tissue reconstructed from a segmented CT scan of the pancreas. This can facilitate 3D visualization and navigation through and around the pancreatic/bile ducts to identify and characterize the cystic lesions and to correlate cystic lesion features with cystic lesion diagnoses. The exemplary system, method, and computer-accessible medium, can help the physician to identify and correctly classify cystic lesion type and degree of dysplasia in the pancreas. This non-invasive tool can help avoid unnecessary surgery in patients with benign cystic lesions that do not have the potential to progress, and can help save lives by identifying cystic lesions that are at risk of progressing to incurable invasive pancreatic cancer.

The exemplary system, method, and computer-accessible medium, can perform user-guided segmentation of the pancreas and cystic lesions. A number of user inputs, including a bounding box and seed points for the foreground and background regions, can be combined with the CT scan images to generate a rough segmentation, which can then be refined by a random walker procedure. Fully automating this can facilitate the segmentation to be performed as a preprocessing step without any user input.

An exemplary visualization interface can be provided for use by a physician. (See e.g., FIG. 5). As shown therein, a tool can be provided for viewing the 2D CT slices as well as for abdominal and pancreas/cystic lesion specific 3D volume rendering and measurements. The 3D visualization can help the user to observe the location of the cystic lesion in relation to the gland and the duct. However, tweaking rendering parameters for individual datasets is time consuming and requires specialized knowledge. Thus, the exemplary system, method, and computer-accessible medium, can include an automatic transfer function generation to alleviate the user of this chore, as well as special rendering modes to enhance the characteristic features of the different cystic lesion types.

The exemplary visualization system, can be used to analyze image output files (e.g., DICOM-compliant abdominal images acquired from a CT scanner), which can be classified as a diagnostic device to aid radiologists in the detection of pancreatic cancer. This can help radiologists to detect both invasive pancreatic cancer and early non-invasive lesions. The differentiation and sensitivity of current imaging systems for invasive cancer can be improved, and the radiologists' reading time can be shortened as compared to using conventional 2D CT imagery only. The early detection can target a patient population with an increased risk of developing pancreatic cancer (e.g., patients with a strong family history of pancreatic cancer or Peutz-Jeghers syndrome, in addition to the ability to detect small lesions in the pancreas. This can provide early screening of patients with non-invasive small lesions found on an incidental scan.

The exemplary system, method, and computer-accessible medium, can analyze the textural features for the segmentation, and both textural and demographic features for the classification. It can provide clinically-relevant and reproducible, quantitative data. The visualization can allow the clinician to view the segmented and unsegmented CT data in 3D from any desired orientation and scale. Automatic custom transfer function generation and custom visualization modes can be utilized to enhance the characteristic features of different cystic lesion types. Since different cystic lesion types have different visual CT appearance, custom rendering modes can be utilized for each cystic lesion type, based on the results of the exemplary classification procedure or indications from the radiologist.

While volume visualization procedures have been developed for various applications, these procedures should be modified and optimized for effective use for a specific application and data. Rendering parameters such as transfer functions can cause large variability in the final rendered images across data if not configured correctly. Customizing these settings for each instance of data is often a hindrance in utilizing 3D visualization in the regular radiologists' workflow. In contrast, the exemplary visualization system can include an automatic transfer function generation that can work consistently on the pancreas centric CT scans, segmented pancreas, and its features, with minimal or no user intervention.

Visualization presets (e.g., pre-configured parameters) can be provided that can enhance features in the pancreatic cystic lesions based on radiologists' input or CAD results. Pancreatic cystic lesions have characteristic features that can help in classifying them into different types. Classification of the cystic lesions is an important part of the diagnosis as it can influence the final diagnosis, treatment, and outcome. These features can be difficult and time-consuming to identify in traditional 2D views. Rendering and enhancing them in 3D, while keeping user interaction to a minimum, can assist the radiologists in the diagnosis process. Exemplary radiological features include: (i) thickness of the cystic lesion wall, (ii) internal texture/pattern, and (iii) presence of calcification. (See e.g., FIGS. 2A-2D). Specifically, SCA cystic lesions (see e.g., FIG. 2A, FIG. 3 element 305) often have a thin wall and a honeycomb-like internal appearance with a central scar or septation, MCN cystic lesions (see e.g., FIG. 2C, FIG. 3 element 315) usually have a thick wall and demonstrate the appearance of a cut orange with peripheral calcification, IPMN cystic lesions (see e.g., FIG. 2B, FIG. 3 element 310) tend to have a thin wall (e.g., if it originates in the secondary duct) and have a "cluster of grapes" like appearance, and SPN cystic lesions (see e.g., FIG. 2D, FIG. 3 element 320) typically consist of solid and cystic components.

The exemplary system, method, and computer-accessible medium can be included in a combined software program, which can include various software modules for segmentation, classification, and visualization. The three modules can be combined into a versatile, user-friendly, comprehensive software package. It can serve as a unified end-to-end pancreatic cancer screening system that is efficient for radiologists' workflow with minimal user intervention. The system can take the raw DICOM images as input and provide a 3D visualization interface with segmented gland and cystic lesions as well as classified cystic lesions. The segmentation and classification modules can be executed simultaneously and automatically in the background after a particular CT dataset is loaded into the system. The segmentation and classification components can also be delivered as independent modules.

The exemplary system, method, and computer-accessible medium can be embodied in a 3D graphics application for visualizing abdominal CT scan data, with specific attention for the segmented pancreas, cystic lesions, and pancreatic ducts. This application can utilize a CT scan (e.g., or other imaging scan) of a patient as an input, as well as corresponding segmentation masks, and provide both 3D and 2D visualization tools. A screenshot of an example of a graphical user interface with a loaded dataset is shown in FIG. 5. In the center, the application provides a 3D view for volumetric rendering of the full dataset, and a view of the unobstructed pancreas, cystic lesion, and pancreatic duct, if visible). The left side bar contains information extracted from the DICOM header and a centerline slice view. The right side contains the conventional 2D slice views (e.g., axial, sagittal, and coronal). Outlines of the segmentation masks are displayed in all of the 2D views as well.

Figure 9:
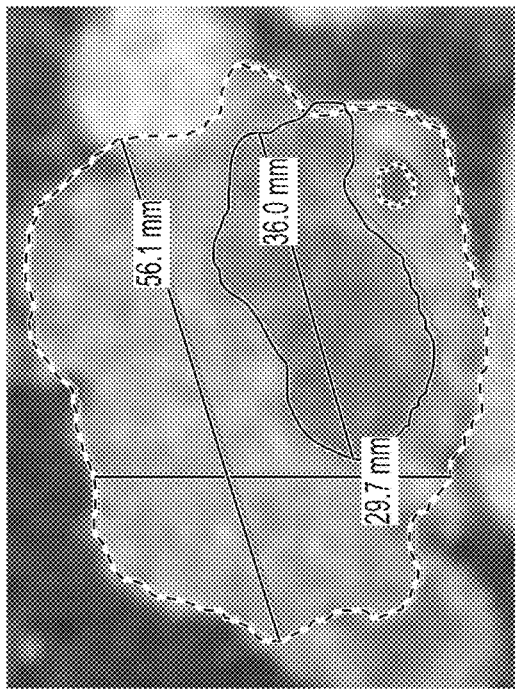
FIG. 9 is a diagram showing a 3D oriented bounding box and associated measurements according to an exemplary embodiment of the present disclosure.
Figure 10:
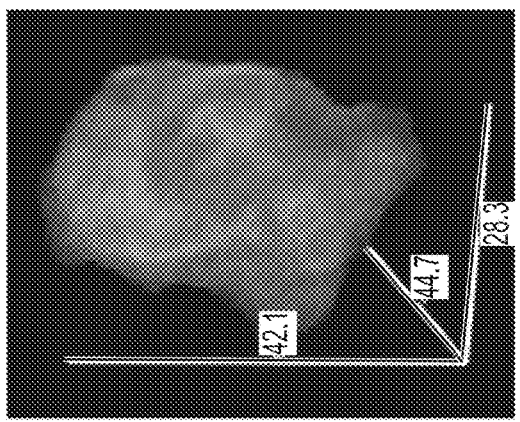
FIG. 10 is an image of 2D slice views according to an exemplary embodiment of the present disclosure.

The user can replace the central view by double clicking on any of the 2D views on the left or right side, allowing for a more detailed investigation of the slice views. For all of the 2D views, mouse-scroll navigation is provided to scroll through the slice stack, in addition to the slider beneath the slices. The following tools are also present in the interface for use during an examination:

Exemplary Measurements: The physician can perform manual distance measurements on a 3D oriented bounding box (see e.g., FIG. 9) and on all 2D slice views (see e.g., FIG. 10), and multiple measurements can be performed simultaneously. The principal components and maximum extents of the cystic lesions can be measured, and volume measurement for the segmented features (e.g., pancreas, cystic lesion, and duct) can be provided. (See e.g., FIGS. 9 and 10).

Figure 11:
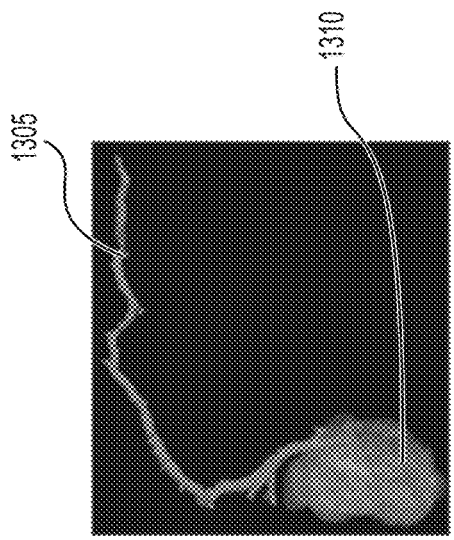
FIG. 11 is an image illustrating a reconstructed 2D slice orthogonal to a centerline according to an exemplary embodiment of the present disclosure.
Figure 12:
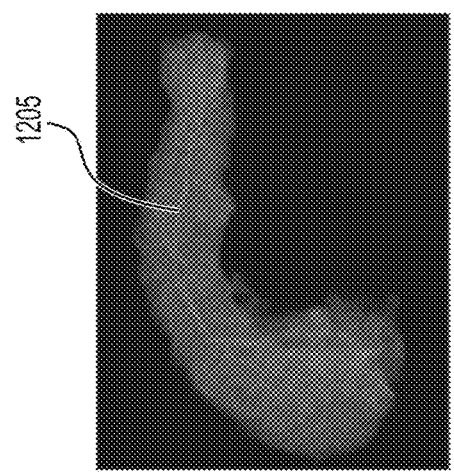
FIG. 12 is a 3D image of a centerline according to an exemplary embodiment of the present disclosure.

Exemplary Pancreas/Duct Centerline Slice View: The physician can view reconstructed 2D slices orthogonal to the centerline of the pancreas 1105, the duct 1110, or the cystic lesion 1115. (See e.g., FIG. 11). This view can provide additional insight into the cystic lesion features and in understanding the cystic lesion-pancreas interface. For context, the corresponding centerline 1205 can be shown in the 3D rendered view. (See e.g., FIG. 12).

Figure 13:
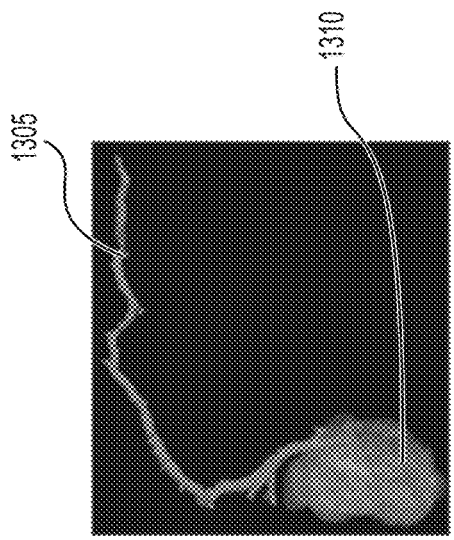
FIG. 13 is a 3D image of a duct according to an exemplary embodiment of the present disclosure.
Figure 14:
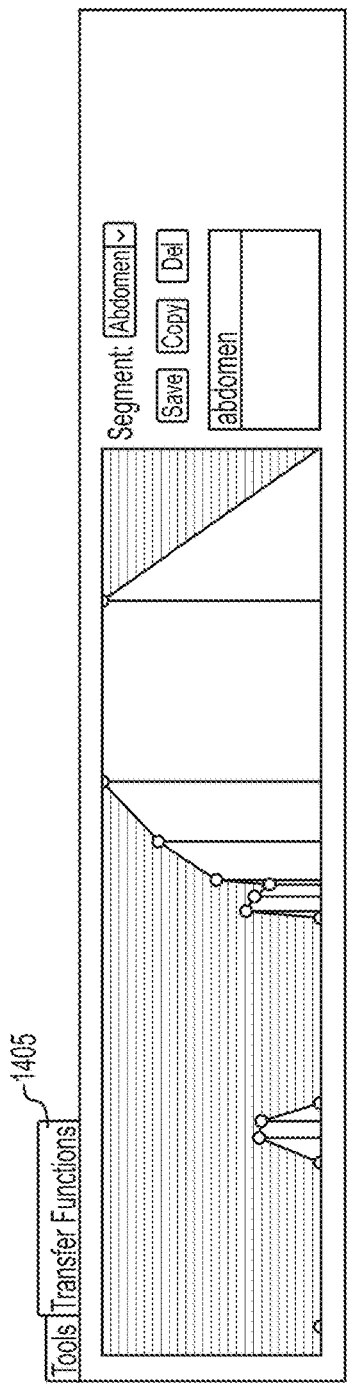
FIG. 14 is an exemplary image of advanced rendering parameters for the visualization interface according to an exemplary embodiment of the present disclosure.

Exemplary Visibility Options: The user can change the visibility (e.g., show/hide) of different overlays using a set of checkboxes at the bottom of the main window. For example, FIG. 13 shows a 3D view of a duct (element 1305) and a cystic lesion (element 1310).

Exemplary Classification Results: After the segmentation has been completed, the classification procedure can be run in the background and the results can be viewed in a special window.

Exemplary Rendering Adjustments: If desired, the user can adjust advanced rendering parameters by editing the transfer functions 1405 for the individual features (e.g., full volume, pancreas, cystic lesion, and duct). Each transfer function can be edited, stored, and loaded as needed. (See e.g., FIG. 13).

Figure 15B:
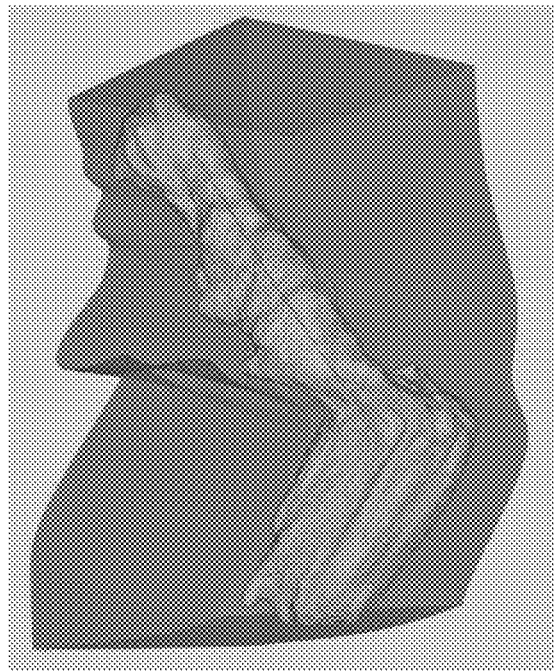
FIG. 15B is a 3D image of the deformed pancreas from FIG. 15A according to an exemplary embodiment of the present disclosure.
Figure 15A:
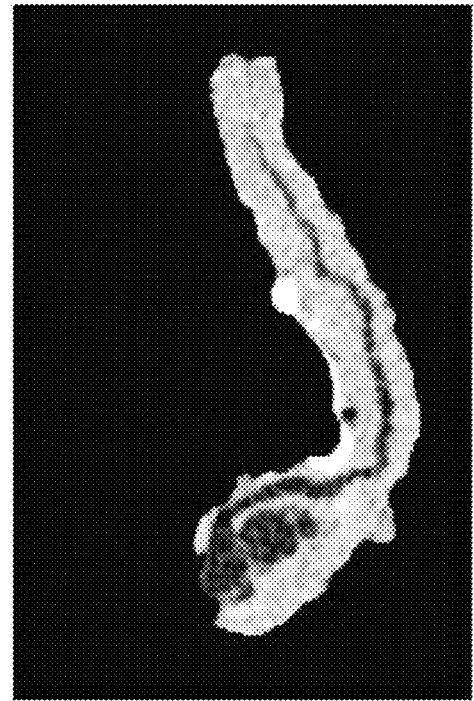
FIG. 15A is a 2D image of a deformed pancreas according to an exemplary embodiment of the present disclosure.

FIGS. 15A and 15B is a set of images illustrating viewing, by a physician, of duct-cystic lesion relationship involving volume deformation of the pancreas, cystic lesion(s) and duct and visualizing in 2D and 3D. For example, the visualizations of the deformed pancreas, cystic lesions and duct are shown in 2D (FIG. 15A) and 3D (FIG. 15B).

Learning Multi-Label Segmentations from Single-Label Datasets

As discussed above, image segmentation is one element employed generally in medical imaging applications and, more particularly, in the present VP systems and methods. Deep learning has proved to be a powerful tool for a broad range of tasks, including semantic segmentation. Progress has been made in this research area, and one of the major factors of such advances is the public availability of large-scale multi-label datasets, such as ImageNet (see, e.g., Reference 14), COCO (see, e.g., Reference 29), PASCAL VOC (see, e.g., Reference 19), and others. Such variety of available datasets not only provides the means to train and evaluate different segmentation models, but also to exhibit diverse labels. However, in contrast to natural images, there are certain domains, where despite the critical importance of segmentation research, the generation of ground truth annotations and labeling is extremely costly and remains a bottleneck in advancing research.

Biomedical imaging is one such domain where the accurate segmentation of various structures is a fundamental problem in clinical research. In traditional clinical practice, segmentation is often omitted during the diagnostic process. However, manual analysis of biomedical images, including measurements, is subject to large variability as it depends on different factors, including the structure of interest, image quality, and the clinician's experience. Moreover, segmentation is an essential component in various medical systems that support computer-aided diagnosis ("CAD") (see, e.g., References 16 and 21) and surgery/treatment planning. Further, early cancer detection and staging, including VP applications, can often depend on the results of segmentation.

Figure 16A:
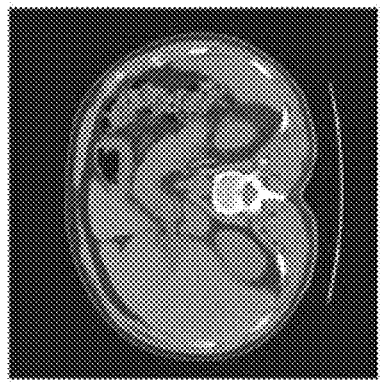
FIGS. 16A-16E are images of the segmentation of an anatomical structure according to an exemplary embodiment of the present disclosure.
Figure 16C:
Figure 16B:
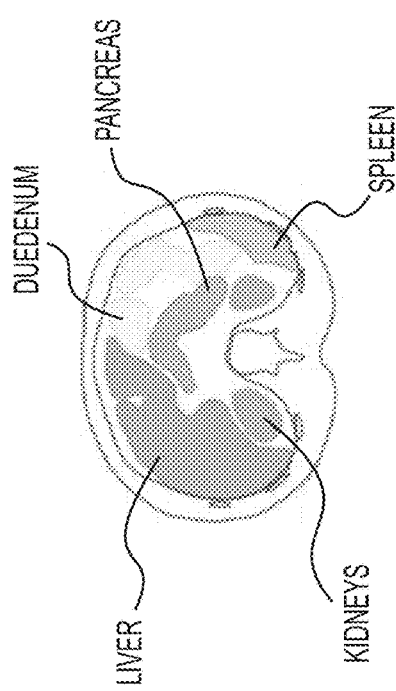
Figure 16D:
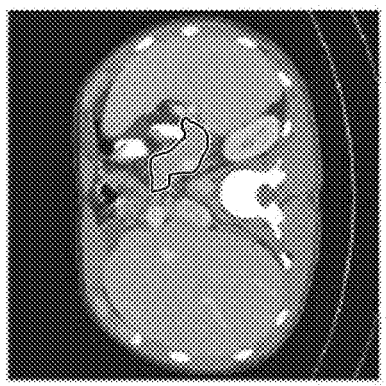
Figure 16E:
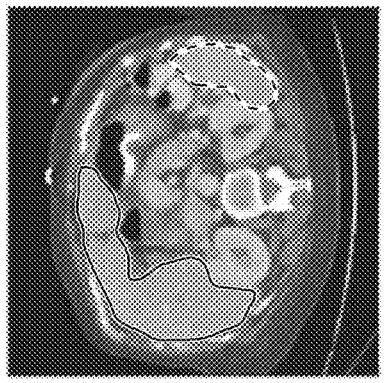

One of the areas of biomedical images where progress has been made in recent years is segmentation of radiological images, such as magnetic resonance imaging ("MRI") and computed tomography ("CT") three dimensional ("3D") scans. Radiological images exhibit various objects, such as abdominal organs (see e.g., FIGS. 16A and 16B), within a single image. However, creating expert annotations for such images is a time consuming and intensive task, and thus multi-label datasets are difficult to generate. A limited number of segmentation procedures have been proposed and evaluated on multi-label datasets. These include private or public datasets, such as VISCERAL (see, e.g., Reference 26), which has been unavailable due to a lack of funding. Moreover, these multi-label datasets are often limited in size (e.g., less than 30 volumes) and come from a single institution, where they were generated using the same imaging protocols and imaging devices, leading to the developed segmentation procedures being sensitive to such imaging parameters. On the other hand, generation of single-label datasets utilizes less time and effort, and they are often publicly available as part of challenges, for example, Sliver07 (see, e.g., Reference 22) (see e.g., FIG. 16C) and NIH Pancreas (see e.g., FIG. 16D). (See, e.g., Reference 23). Additionally, these single-label datasets come from different institutions, and exhibit variability in factors, such as the presence of malignancy, imaging protocols, and reconstruction procedures.

However, while single-label datasets often contain the same objects within a single image, the ground truth annotations are provided for only a particular class of objects in the form of binary masks, and the sets of images themselves do not overlap between datasets. Thus, it is obstructive to simply combine the datasets to train a model for multi-label segmentation. Generally, single-label datasets have been used to develop highly tailored solutions for the segmentation of particular classes.

Previous work has been performed on generating images conditioned on certain attributes, such as category or labels, and has shown successful and compelling results. (See, e.g., References 28, 38, 40, and 41). For example, a framework for person image synthesis based in arbitrary poses has been proposed. (See, e.g., Reference 31). Other work has modeled a distribution of potential results of the image-to-image translation. (See, e.g., Reference 44). Synthesis of images has also been demonstrated given the desired content and its location within the image. (See, e.g., Reference 35). However, the area of conditional convnets for semantic segmentation has been left untapped, and no application has been explored. The exemplary system, method, and computer-accessible medium, can include a conditioning convnet, which can be used for segmentation, and then to evaluate the segmentation of abdominal organs.

Segmentation of anatomical structures, especially abdominal organs, can be considered a difficult problem, as they demonstrate a high variability in size, position, shape, and noise. (See e.g., FIGS. 16A-16E). Various convnet-based segmentation procedures have been proposed for abdominal organ segmentation. The majority of these procedures that utilize single-label datasets can be specialized on the segmentation of a particular organ, such as the liver (see, e.g., References 17 and 30) or the pancreas. (See, e.g., References 20 and 36). Some more generally applicable convent-based procedures have been proposed and tested on multiple organs. (See, e.g., Reference 18). All of these procedures describe models, and can be applied for the segmentation of individual organs, and the separate segmentations can be fused together to produce the final labels. However, while showing state-of-the-art performance, these models can be trained and applied separately for the segmentation of each organ, which manifests inefficient usage of computational resources and additional training time. Moreover, such separately trained models do not embed the spatial correlations among abdominal organs and thus can be likely to be overfitted for each particular single-label dataset. Additionally, these models often utilize pre- and post-processing steps, which complicate and particularize the models even further.

Several studies have been proposed for the simultaneous multi-label, or multi-organ, segmentation of anatomical structures in medical images. The majority of these utilize probabilistic atlases (see, e.g., References 13, 33, and 39) and statistical shape models. (See, e.g., Reference 32). These procedures utilize all volumetric images in the training dataset to be registered. This pre-processing step can be computationally expensive, and often imperfect due to the considerable variations in size, shape, and location of abdominal organs between patients. Recently, a few convnet-based solutions were proposed for simultaneous multi-organ segmentation. (See, e.g., Reference 37). However, all such procedures were developed and evaluated on publicly unavailable multi-label segmentation datasets. Moreover, the used multi-label datasets were acquired by a single institution and exhibit the same image quality and lack chronic abnormalities. The exemplary system, method, and computer-accessible medium, can leverage diverse single-label datasets and describe a procedure for conditioning a convnet to develop a multi-label segmentation model of high generalization ability.

Instead of generating separate models for each object in single-label datasets, the exemplary system, method, and computer-accessible medium, can simultaneously learn multi-label knowledge given a set of single-label datasets. For example, consider a set of single-label datasets $\{\mathcal{D}_1, \ldots, \mathcal{D}_k\}$, where each dataset $\mathcal{D}_j = \{I^j; Y^{j,c_i}\}$, $j \in \{1, \ldots, k\}$ contains a set of input images $I^j = \{I_p^j\}$ and a set of corresponding binary segmentation masks $Y^{j,c_i} = \{Y_p^{j,c_i}\}$ of object $c_i \in C$, i=1, . . . m. Additionally, each set of input images $I^j$ contains objects of all labels $c_i \in C$. Moreover, it can also be assumed that datasets $\mathcal{D}_j$ do not have the same pairs of $\{I^j; Y^{j,c_i}\}$, such as $\mathcal{D}_j \cap \mathcal{D}_j = \emptyset$, $\forall$ i, j, and each dataset can have different cardinalities. These assumptions greatly relax the initial conditions, and attempt to make the description of the problem more general and challenging. The goal can be to predict a set of segmentation masks $\{\hat{Y}_I^c, \forall_{c_i} \in C\}$, given an unseen input image Î.

Exemplary Base Model

The exemplary system, method and computer-accessible medium, can include a 3D fully-convolutional U-net-like architecture, such as an encoder-decoder with skip connections. (See e.g., FIG. 17A). For example, as shown therein, input images 1705 from K single-label datasets, along with class labels 1725, can be conditioned using a base model 1710, which can include an encoder 1715 and a decoder

1720. This can result in a plurality of output segmentations 1730. The conditioning can be performed for either the encoder layers 1715 (see e.g., FIG. 17B) or the decoder layers 1720 (see e.g., FIG. 17C) of the base model 1710, or both.

Additionally, 3D densely connected convolutional blocks (see, e.g., References 24 and 25) can be utilized, which can effectively utilize the volumetric information available in the CT scans. The exemplary model can include densely-connected units of a composite function $H_l(\cdot)$, and the output $x_l$ of the $l^{th}$ layer can be defined as, for example:

$$x_l = H_l([x_0, x_1, \ldots, x_{l-1}]) \quad (4)$$

where [ . . . ] can be a concatenation operation of the feature maps from previous layers. In the exemplary experiments, $H_l(\cdot)$ can be defined as a rectified linear unit ("ReLU"), followed by a 3×3×3 convolution. The encoder part of the model can include a convolutional layer, followed by six densely connected convolutional blocks, sequentially connected via 2×2×2 maxpooling layers. The number of feature channels in each dense block can be proportional to its depth. The decoder part of the model can utilize transposed convolutions with strides as upsampling layers and can be topologically symmetric to the encoder. The last convolutional layer can end with a sigmoid function.

Exemplary Conditioning

Unlike classic approaches of training separate models for each label $c_i \in C$, the exemplary framework can infer the segmentations and the relationships of multiple labels from single-label datasets, and can learn to generate segmentations for all labels $c_i$ with a single model. The exemplary system, method, and computer-accessible medium, can be used to condition the base convolutional model with a target label $c_i$ that needs to be segmented. While certain procedures for conditioning have been widely used in generative adversarial nets ("GANs") (see, e.g., References 15, 31, and 35) for image synthesis, there have been no previous attempts to condition a convnet for segmentation.

It can be beneficial to keep the base model fully-convolutional, simple, and efficient in order to avoid additional overhead that could negatively affect the performance. To achieve this, the exemplary system, method, and computer-accessible medium can incorporate the conditional information as a part of the intermediate activation signal after performing convolutional operations and before applying nonlinearities. While some examples of conditioned GANs (see, e.g., Reference 35) suggest learning the conditional function, a more computationally efficient approach for the task of segmentation can be used. Specifically, the following exemplary function can be used:

$$\varphi(c_i, H_j, W_j, D_j) = O^{H_j \times W_j \times D_j} \odot \text{hash}(c_i) \quad (5)$$

where $\odot$ can be an element-wise multiplication, $O^{H \times W \times D}$ can be a tensor of size H×W×D with all elements set to 1, and hash $(\cdot)$ can be a hash function for a pre-defined lookup table. That can be, the function $\varphi(c_i, H_j, D_j)$ can create a tensor of size $H_j \times W_j \times D_j$ with all values set to hash$(c_i)$. Therefore, the exemplary conditioning of the $l^{th}$ layer with the input $x_l$ of size $H_l \times W_l \times D_l$ can be defined as, for example:

$$x_l = [x_{l-1}, \varphi(c_i, H_l, D_l)] \quad (6)$$

where $x_{l-1}$ can be the output of the previous layer. It can be important to note that the exemplary conditioning does not depend on the possible attributes of the labels, such as location, shape, etc. It can be done to increase the generalization ability of the exemplary system, method, and computer-accessible medium.

During training time, the network can be trained on pairs $\{I_j, Y^{j,c_i}\}$ that can be randomly sampled from different datasets $D_j$, while being conditioned on the corresponding label $c_i$ in the binary ground truth segmentation mask $Y^{j,c_i}$. During the inference time, the network can be sequentially conditioned on all $c_i \in C$ to generate segmentations masks $\{\hat{Y}^{c_i}\}$ for all objects in the input image $\hat{I}$. While such an approach of using a pre-defined lookup table can maintain simplicity and austerity without additional variables to be trained, it also can have some practical benefits. In particular, in the event of adding a new target segmentation label $c_{m+1}$, the exemplary system, method, and computer-accessible medium can only utilize a new entry to the lookup table and a simple fine-tuning; unlike the expensive re-training expected if the conditional function had been learned.

Given an encoder-decoder like architecture, one can expect better performance when the conditioning can be performed on the layers in the decoder, which could use the provided conditional information and the low-level information present in the encoder features maps to map them to higher levels within the network. Moreover, the conditional information directly accessible to multiple layers can facilitate optimization.

Exemplary Multi-Label Experiments

The exemplary experiments can include different kinds of loss functions and various ways of conditioning, and comparing the results to the solutions, which were individually customized for each single-label dataset or designed for multi-label datasets. The exemplary conditioned multi-label segmentation framework outperforms current state-of-the-art single-label segmentation approaches. The results are summarized in Table 5 shown below.

Exemplary Multi-Label Datasets: To evaluate the exemplary system, method, and computer-accessible medium, three single-label datasets of abdominal CT volumes can be used. In particular, 20 volumes of the publicly available Sliver07 dataset (see, e.g., Reference 22) of liver segmentations, 82 volumes of the publicly available NIH Pancreas dataset (see, e.g., Reference 23) of pancreas segmentations, and 74 volumes from our additional dataset of liver and spleen segmentations were used. Therefore, in the exemplary experiments, $c_i \in C = \{\text{liver, spleen, pancreas}\}$. The segmentation masks in the latter dataset have been binarized and stored as separate single-label files. Examples of the CT images and the corresponding ground-truth segmentation masks are illustrated in FIGS. 16C-16E and FIG. 19. Each dataset was divided into training and validation sets with a ratio of about 80/20. The size of the volumes in each dataset was about 512×512×$Z_0$. Each dataset was collected at different institutions with different imaging scanners and protocols, and incorporates volumes of various inter-slice spacings and, moreover, exhibited various pathologies, such as hepatic tumors and cases of splenomegaly. Such diversity in the datasets allows for the testing of the exemplary system, method, and computer-accessible medium, can in a challenging setting.

The input images have been minimally preprocessed: each image has been resized to about 256×256×$Z_0$ and normalized. During training, each dataset was sampled with an equal probability, and subvolumes of size about 256×256×32 have been extracted to create training input images. Additionally, all training examples have been augmented with small random rotations, zooms, and shifts.

Exemplary Multi-Label Training: The exemplary system, method, and computer-accessible medium was trained on examples from all used single-label datasets.

The framework was optimized with the following objective:

$$\mathcal{L}(Y,\hat{Y})=\alpha_1\beta_1\mathcal{L}_1(Y^{c_1},\hat{Y}^{c_1})+\ldots+\alpha_n\beta_k\mathcal{L}_k(Y^{c_k},\hat{Y}^{c_k}), \quad (7)$$

where $\mathcal{L}_i(Y^{c_i}, \hat{Y}^{c_i})$ can be a loss function for a single-label dataset $\mathcal{D}_i$, the hyperparameters $\alpha_i$ can specify the impact of particular labels $c_i$ on the total loss, and $\beta_i=\{0,1\}$ can specify the presence of the label $c_i$ in the training batch.

Exemplary Multi-Label Inference: During the inference time, the target segmentation label $c_i$ can be specified. However, to simplify the use of the framework during the inference time, the process of specifying the target segmentation label can be automated by iteratively going through all the entities in the lookup table. Alternatively, specifically for segmentation of abdominal organs, a set of presets can be defined, such as liver and gallbladder, which can often be analyzed together by clinicians.

Exemplary Multi-Label Implementation: The exemplary system, method, and computer-accessible medium was implemented using the Keras library with Tensor-Flow backend. The exemplary network was trained from scratch using use Adam optimizer (see, e.g., Reference 27) with the initial learning rate or 0.00005, and $\beta_1=0.9$, $\beta_2=0.999$, with a batch size of 2 for 25K iterations.

Exemplary Multi-Label Ablation Experiments

The predicted segmentation masks can be binarized by thresholding them at about 0.5. The common Dice Similarity Coefficient ("DSC") metric can be used, which can be defined as $$DSC(Y,\hat{Y}) = \frac{2\Sigma Y \odot \hat{Y}}{\Sigma Y + \Sigma \hat{Y}},$$

and can measure the similarity between binary segmentation masks Y and $\hat{Y}$. The exemplary results were compared against the current state-of-the-art segmentation methods, which were proposed specifically for single-label segmentation and can be tailored for a particular label. In particular, the exemplary system, method, and computer-accessible medium, was compared to prior work (see, e.g., Reference 43), which described a two-step convnet-based solution for pancreas segmentation, and yielded 82.4% DSC on the NIH Pancreas dataset. (See, e.g., Reference 23). The exemplary system, method, and computer-accessible medium, was also compared to another convnet-based segmentation work (see, e.g., Reference 42), which showed 95% DSC on a private datasets of 1000 CT images of the liver. The exemplary results were also compared to a two-stage multi-organ convnet-based solution (see, e.g., Reference 37), which was evaluated on a private multi-label dataset and resulted in 95.4%, 92.8%, and 82.2% DSC for liver, spleen, and pancreas, respectively.

In all exemplary experiments described $\alpha_1=1$ and the DSC-based loss function can be as follows:

$$\mathcal{L}_i(Y^{c_i}, \hat{Y}^{c_i}) = 1 - \frac{2\Sigma Y^{c_i} \odot \hat{Y}^{c_i}}{\Sigma Y^{c_i} + \Sigma \hat{Y}^{c_i}} \quad (8)$$

Additionally, the binary cross-entropy loss function was tested, which showed significantly worse performance. The exemplary experiments began by analyzing the performance of the exemplary base model trained separately for each label $c_i$ without the use of conditioning. This experiment can be referred to as indivs and the learning curves for each model are illustrated in FIGS. 18A-18E. For example, line 1805 illustrates state of the art segmentation results for the liver (row 1820), the spleen (row 1825), and the pancreas (row 1830) for dice similarity coefficients: 95.2, 92.8, and 82.4, which are shown in Table 5 below. Line 1810 illustrates dice similarity coefficients for the liver, the spleen, and the pancreas on images in the training dataset. Line 1815 shows results for dice similarity coefficients for the liver, the spleen, and the pancreas on images in the testing dataset. It can be observed that, while the models failed to get close to the state-of-the-art performance during the first 25K iterations, the results show that the models have enough representational capacity and performance can be improved given more training time.

Next, a naive approach of training a single model on single-label datasets was tested to produce reasonable multi-label segmentation results by predicting a volume of the same dimensions but with three channels, each for each label $c_i$, such as liver, spleen, and pancreas. This experiment can be referred to as no cond, and the learning curves are illustrated in FIG. 18B. The results show that the training does not converge, which can be explained by the fact that the model struggles to infer multi-label relationships from the inconsistent binary labels in the training examples. Additionally, this approach can be memory-bounded and only a small number of labels can be modeled this way

TABLE 7

The comparison of segmentation accuracy (e.g., mean DSC, %) for different models for the segmentation of liver, spleen, and pancreas (e.g., higher is better).

| Model | Liver | Spleen | Pancreas |
|---|---|---|---|
| Model 1 (see e.g., Reference 42) | 95.0 | — | — |
| Model 2 (see e.g., Reference 43) | — | — | 82.4 |
| Model 3 (see e.g., Reference 37) | 95.2 | 92.8 | 82.2 |
| indivs | 91.5 | 74.4 | 42.9 |
| no cond | 14.7 | 21.8 | 18.6 |
| cond-2nd | 89.7 | 71.7 | 44.4 |
| cond-enc | 88.1 | 76.9 | 57.3 |
| cond-dec | 95.8 | 93.7 | 85.1 |

In the experiment cond-2nd, a simple way of conditioning a single model was tested by providing the conditional information as the second channel of the input volume. In particular, a lookup table of conditioning variables was defined for each $c_i$ with random real values sampled from [−1, 1]. Specifically, each training 3D subvolume has been augmented in the second channel with a volume of the same size with all elements set to hash($c_i$). The learning curves illustrated in FIG. 18C show that the model was able to utilize the provided conditional information and to learn to generate multi-label segmentations. However, similarly to the experiment cond-enc (see e.g., FIG. 18D), where each dense block in the encoder had direct access to the conditional information, the model shows suitable.

Figure 18E:
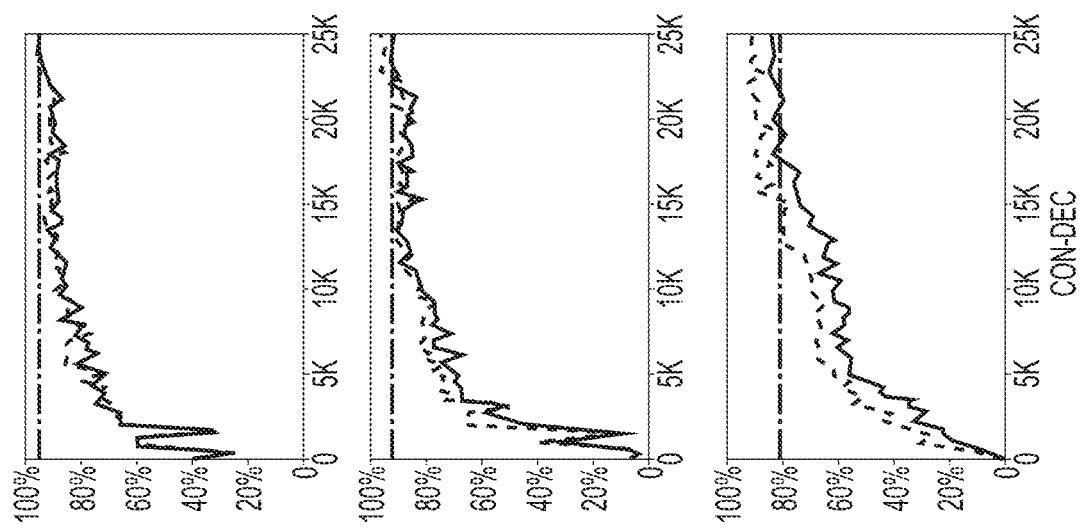
Figure 19:
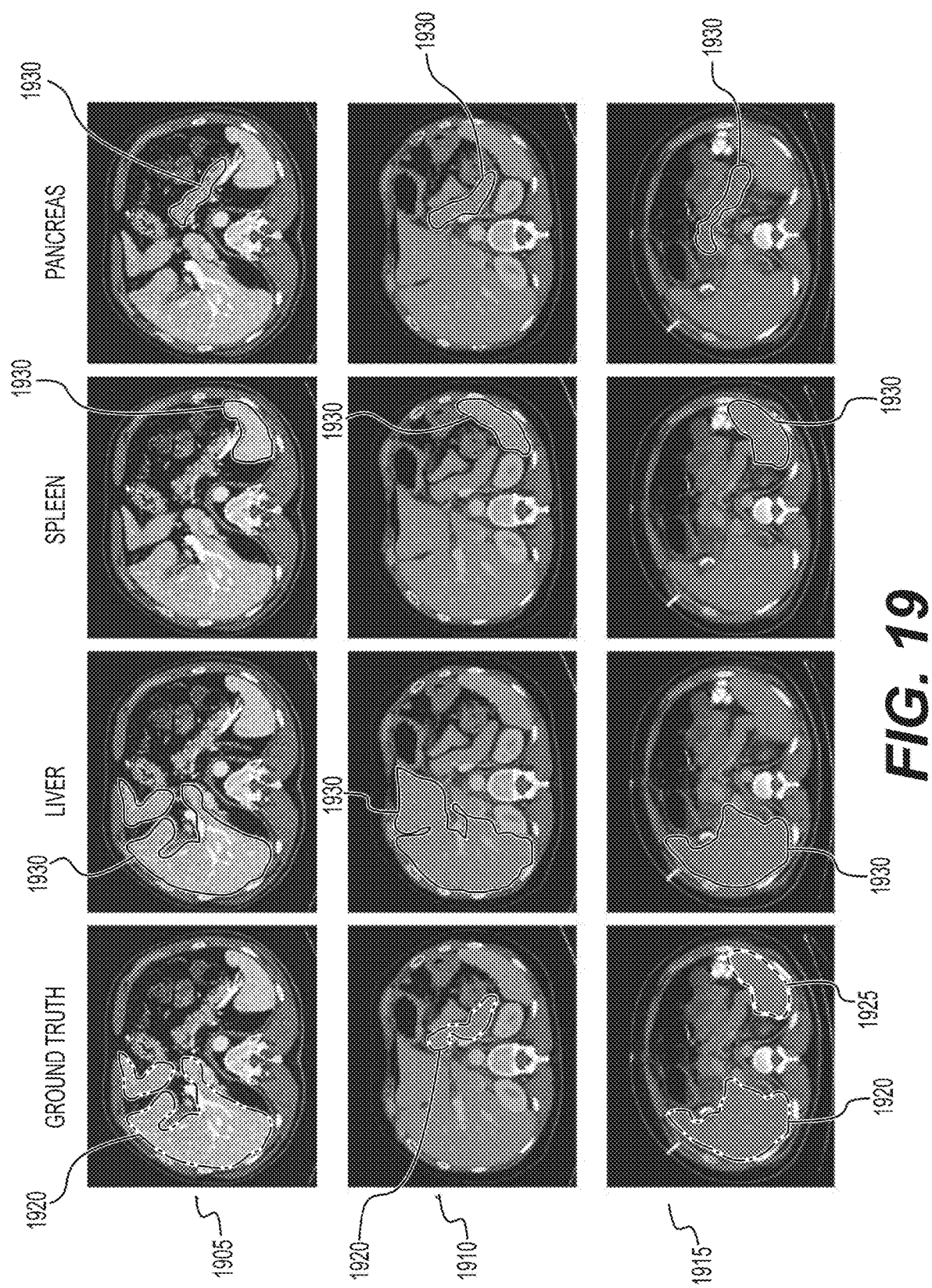
FIG. 19 is a set of exemplary CT images according to an exemplary embodiment of the present disclosure.

Further, conditioning the decoder part of the base model was examined by providing direct access to the conditioning tensors. The learning curves illustrated in FIG. 18E show a superior segmentation performance. The training in this experiment converges faster than in the other experiments. In addition to outperforming both meticulously tailored solutions for single-label segmentation and multi-label segmentation solutions designed on private datasets, the exemplary framework also shows significant generalization ability. Examples of the segmentation results for this experiment are illustrated in FIG. 19. It can be observed that the model accurately delineates all the target objects even in a difficult case illustrated in FIG. 19 (e.g., row 1905), where due to the imaging protocol on all the organs, besides being congested together, also have similar intensities and their boundaries can be hard to differentiate. The reason for such accurate segmentations by the exemplary model can be due to (i) a high degree of implicit parameter sharing between all labels being modeled, and (ii) the ability of the decoder path to capitalize on the available conditional information and gradually recover the spatial information and sharp boundaries of the target labels.

As shown in FIG. 19, each row 1905, 1910, and 1915 shows segmentation examples (e.g., outlines 1920 and outline 1925) for ground truth segmentation manually generated by an expert. Outline 1930 show automatically generated outlines for different organs in different datasets. For example, row 1905 shows segmentation results for an image from a dataset that has a ground truth segmentation for liver. Row 1910 shows segmentation results for an image from a dataset that has a ground truth segmentation for pancreas. Row 1910 shows segmentation results for an image from a dataset that has a ground truth segmentation for liver and spleen.

The exemplary system, method, and computer-accessible medium, can include learning multi-label segmentations from non-overlapping-label datasets by conditioning a convnet for multi-label segmentation. Extensive experimental evaluation of the various ways of conditioning the model was performed, which found that providing each layer in the decoder path direct access to the conditional information yields the most accurate segmentation results. The exemplary system, method, and computer-accessible medium was evaluated on a task of segmentation of medical images, where the problem of single-label datasets naturally arises. While being significantly more computationally efficient, the method outperforms current state-of-the-art solutions, which were specifically tailored for each single-label dataset.

While the exemplary model was validated using radiological CT images, it can be easily expanded to applications in various other domains. In particular, the exemplary system, method, and computer-accessible medium can be applied for the detection of cancer metastases in pathology images. Pathology for metastases detection show similar dataset fragmentation—a unified database of pathology images of various biological tissues, such as brain or breast, currently does not exist and research focuses on separate subproblems. Similar to the exemplary experiments, a convent can be conditioned on the target type of metastasized cancel cells in different tissue samples. Moreover, similar applications of conditioning a convnet for the purpose of instance-level segmentation, where each instance can be conditioned on certain attributes, such as size, color, etc., or something more sophisticated, such as species or kind can be applied. Furthermore, prior work has described a method of learning data representations in multiple visual domains for the purpose of classification (see, e.g., Reference 34). The exemplary system, method, and computer-accessible medium can augment such works for the purpose of segmentation.

Figure 20A:
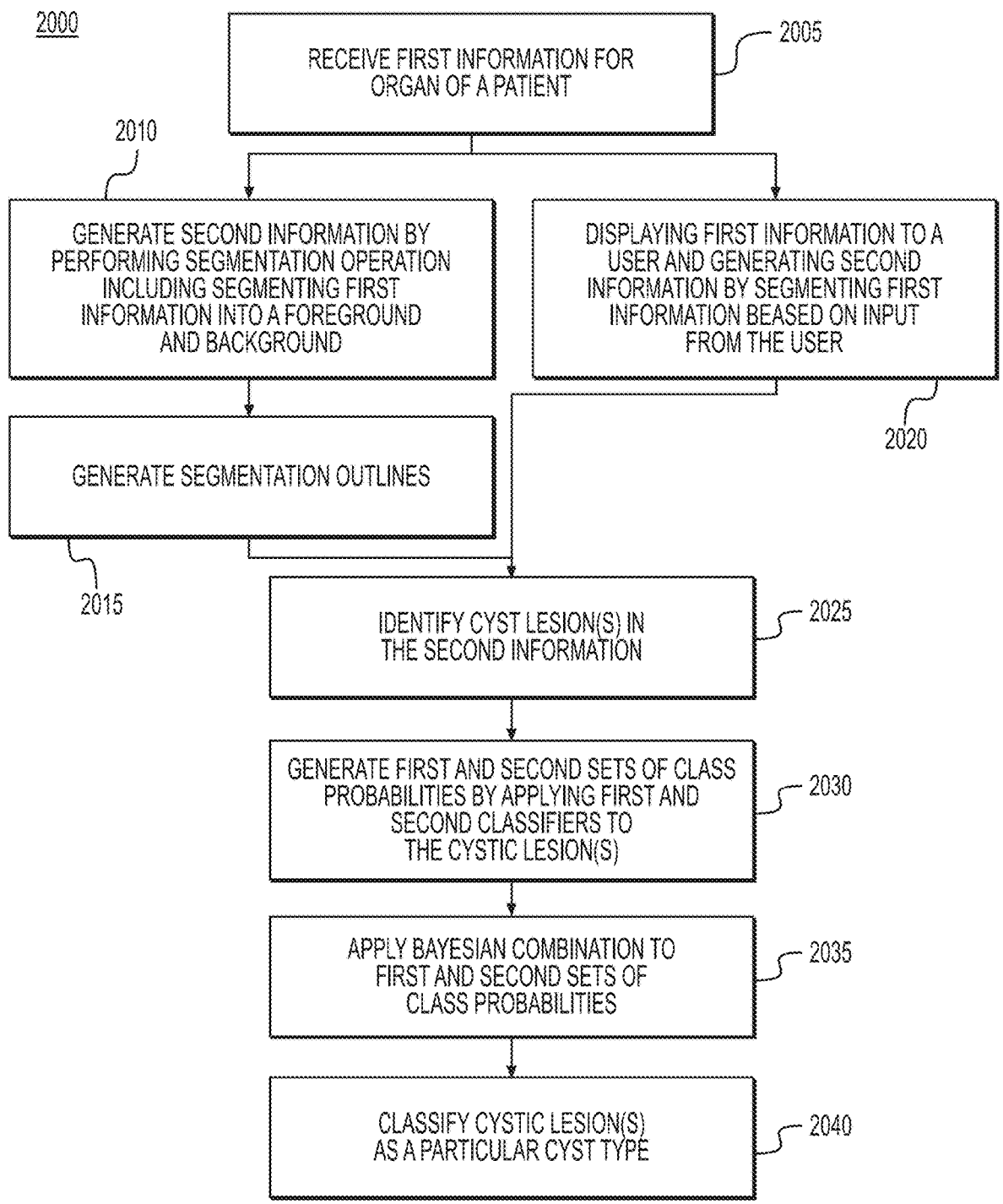
FIG. 20A is a flow diagram of an exemplary method for using medical imaging data to screen for one or more cystic lesions according to an exemplary embodiment of the present disclosure.

FIG. 20A is a flow diagram of a method 2000 for using medical imaging data to screen for one or more cystic lesions according to an exemplary embodiment of the present disclosure. For example, at procedure 2005, first information of an organ of a patient can be received. At procedure 2010, second information can be generated by performing a segmentation operation, which can include segmenting the first information into a foreground and a background. At procedure 2015, segmentation outlines can be generated based on the foreground and the background. Alternatively, or in addition, at procedure 2020, the first information can be displayed to a user, and then the second information can be generated by performing a segmentation procedure on the first information based on input from the user. At procedure 2025, one or more cystic lesions in the second information can be identified. At procedure 2030, first and second class probabilities can be generated by separately applying first and second classifiers to the one or more cystic lesions. At procedure 2035, the results of the first and second classifiers may be combined, such as by a Bayesian combination being applied to the first and second sets of class probabilities, and the one or more cystic lesions can be classified as a particular typo based on the Bayesian combination.

Figure 20B:
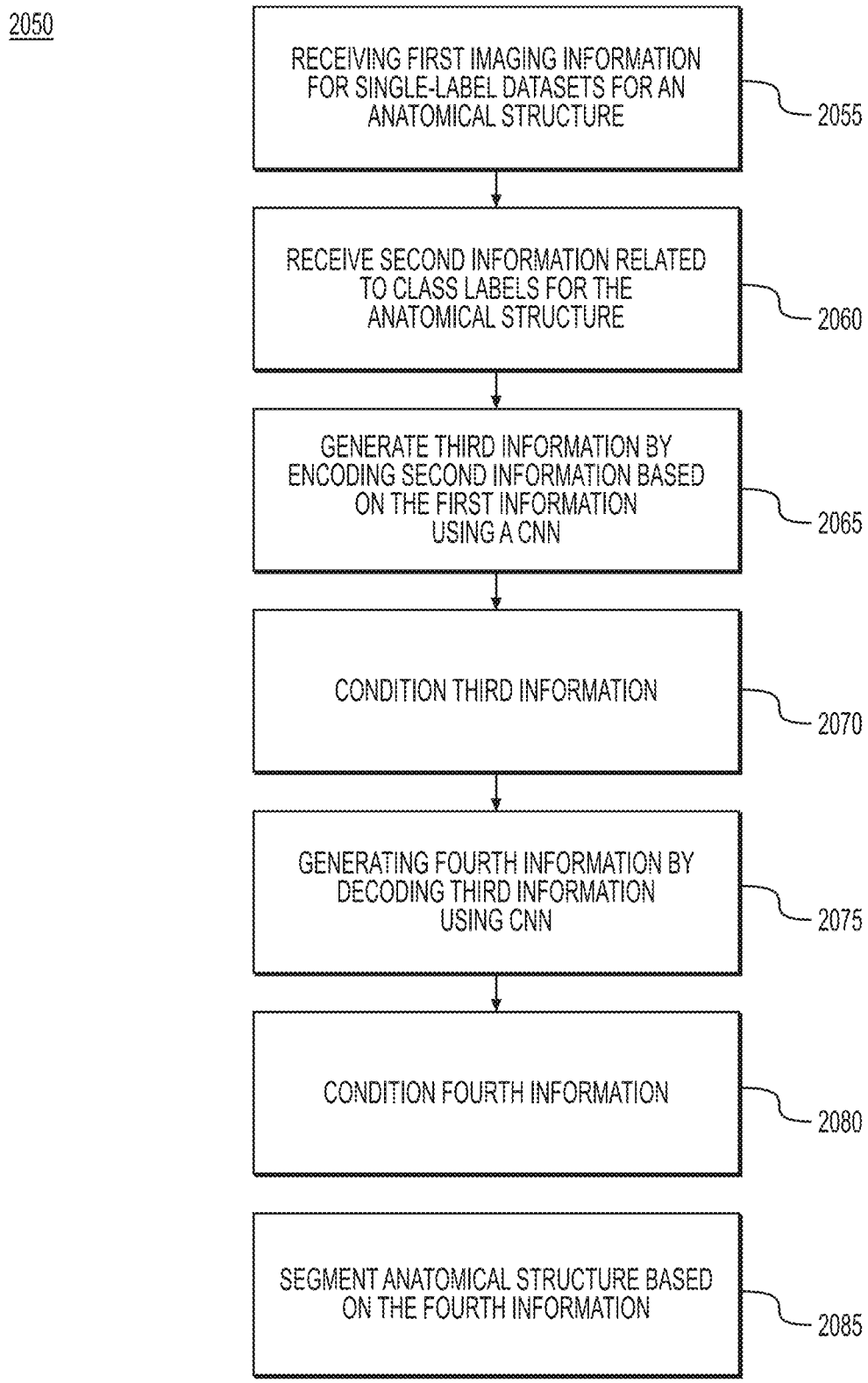
FIG. 20B is a flow diagram of an exemplary method for multi-label segmentation of an anatomical structure(s) according to an exemplary embodiment of the present disclosure.

FIG. 20B is a flow diagram of an exemplary method 2050 for multi-label segmentation of an anatomical structure(s) according to an exemplary embodiment of the present disclosure. For example, at procedure 2055, first information related to a single-label dataset for an anatomical structure can be received. At procedure 2060, second information related to class labels for the anatomical structure can be received. At procedure 2065, third information can be generated by encoding the second information based on the first information using a convolutional neural network. At procedure 2070, the third information can be conditioned. At procedure 2075, fourth information can be generated by decoding the third information using the convolutional neural network. At procedure 2080, the fourth information can be conditioned. At procedure 2085, the anatomical structure can be segmented based on the fourth information.

Figure 21:
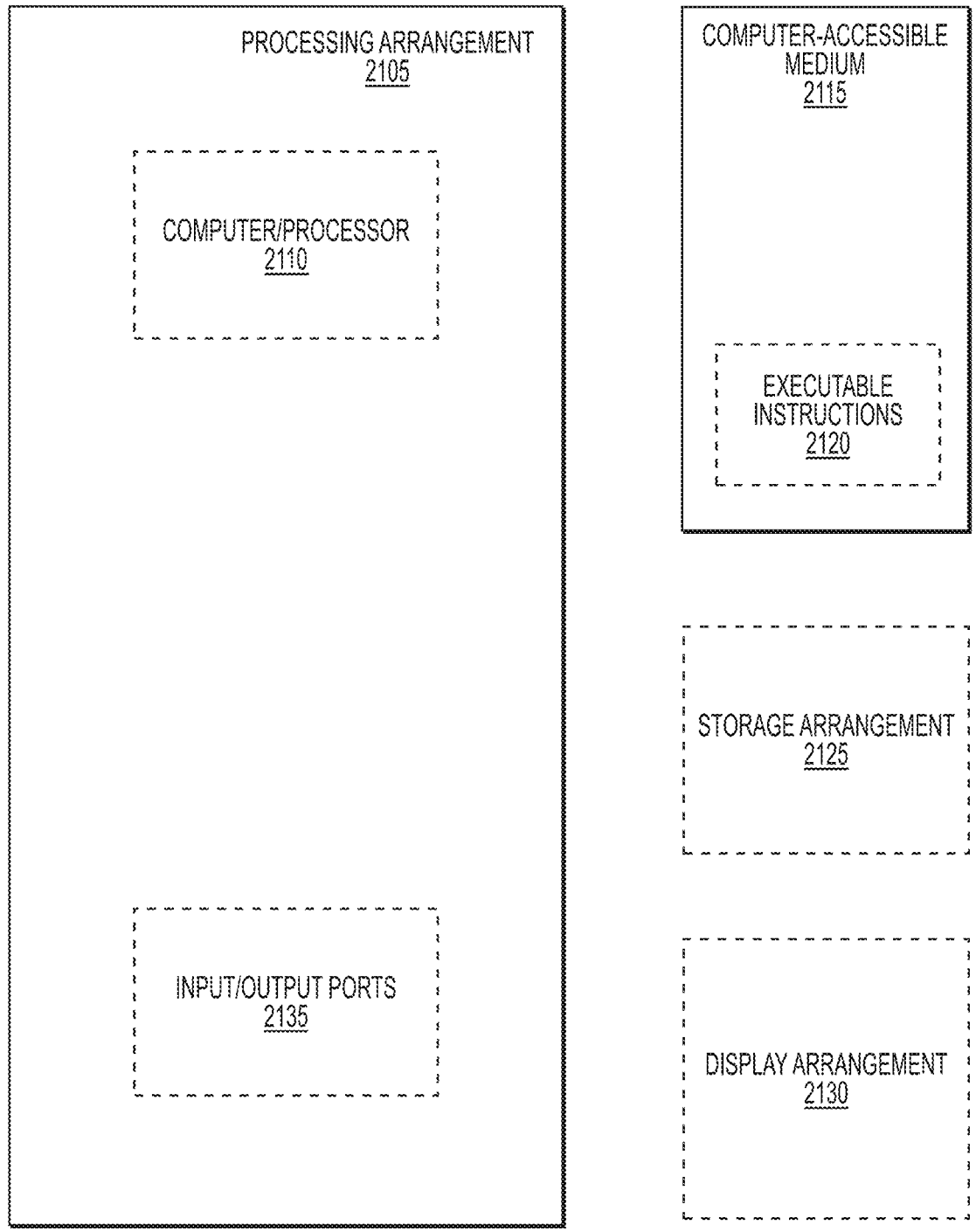
FIG. 21 is an illustration of an exemplary block diagram of an exemplary system in accordance with certain exemplary embodiments of the present disclosure.

FIG. 21 shows a block diagram of an exemplary embodiment of a system according to the present disclosure, which can be used to perform method 200 described above. For example, exemplary procedures in accordance with the present disclosure described herein (e.g., method 2000) can be performed by a processing arrangement and/or a computing arrangement (e.g., computer hardware arrangement) 2105. Such processing/computing arrangement 2105 can be, for example entirely or a part of, or include, but not limited to, a computer/processor 2110 that can include, for example one or more microprocessors, and use instructions stored on a computer-accessible medium (e.g., RAM, ROM, hard drive, or other storage device).

As shown in FIG. 21, for example a computer-accessible medium 2115 (e.g., as described herein above, a storage device such as a hard disk, floppy disk, memory stick, CD-ROM, RAM, ROM, etc., or a collection thereof) can be provided (e.g., in communication with the processing arrangement 2105). The computer-accessible medium 2115 can contain executable instructions 2120 thereon. In addition or alternatively, a storage arrangement 2125 can be provided separately from the computer-accessible medium 2115, which can provide the instructions to the processing arrangement 2105 so as to configure the processing arrangement to execute certain exemplary procedures, processes, and methods, as described herein above, for example. Exemplary procedures can include, receiving imaging information for a patient, segmenting the imaging information, and classifying a cystic lesion in the imaging information.

Further, the exemplary processing arrangement 2105 can be provided with or include an input/output ports 2135, which can include, for example a wired network, a wireless network, the internet, an intranet, a data collection probe, a sensor, etc. As shown in FIG. 21, the exemplary processing arrangement 2105 can be in communication with an exemplary display arrangement 2130, which, according to certain exemplary embodiments of the present disclosure, can be a touch-screen configured for inputting information to the processing arrangement in addition to outputting information from the processing arrangement, for example. For example, display arrangement 2130 can be used to display imaging information to a user (e.g., a doctor), which can provide input to perform a segmenting operating on the imaging information. Further, the exemplary display arrangement 2130 and/or a storage arrangement 2125 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties.

[1] Lennon, A. M., Wolfgang, C. L., Canto, M. I., Klein, A. P., Herman, J. M., Goggins, M., Fishman, E. K., Kamel, I., Weiss, M. J., Diaz, L. A., Papadopoulos, N., Kinzler, K. W., Vogelstein, B., Hruban, R. H.: The early detection of pancreatic cancer: What will it take to diagnose and treat curable pancreatic neoplasia? Cancer Research 74(13) (2014) 3381-3389.

[2] Sahani, D. V., Sainani, Blake, M. A., Crippa, S., Mino-Kenudson, M., del Castillo, C. F.: Prospective evaluation of reader performance on mdct in characterization of cystic pancreatic lesions and prediction of cyst biologic aggressiveness. American Journal of Roentgenology 197(1) (2011) W53-W61.

[3] Dmitriev, K., Guntenko, I., Nadeem, S., Kaufman, A.: Pancreas and cyst segmentation. Proc. of SPIE Medical Imaging (2016) 97842C-97842C.

[4] Maggioni, M., Katkovnik, V., Egiazarian, K., Foi, A.: Nonlocal transform-domain filter for volumetric data denoising and reconstruction, IEEE Transactions on Image Processing 22(1) (2013) 119-133.

[5] Cho, H. W., Choi, J. Y., Kim, M. J., Park, M. S., Lim, J. S., Chung, Y. E., Kim, K. W.: Pancreatic tumors: emphasis on CT findings and pathologic classification. Korean Journal of Radiology 12(6) (2011) 731-739.

[6] Yang, M., Kpalma, K., Ronsin, J.: A survey of shape feature extraction techniques. Pattern Recognition (2008) 43-90.

[7] Raman, S. P., Chen, Y., Schroeder, J. L., Huang, P., Fishman, E. K.: CT texture analysis of renal masses: pilot study using random forest classification for prediction of pathology. Academic Radiology 21(12) (2014) 1587-1596.

[8] Raman, S. P., Schroeder, J. L., Huang, P., Chen, Y., Coquia, S. F., Kawamoto, S., Fishman, E. K.: Preliminary data using computed tomography texture analysis for the classification of hypervascular liver lesions: generation of a predictive model on the basis of quantitative spatial frequency measurements—a work in progress. Journal of Computer Assisted Tomography 39(3) (2015) 383-395.

[9] Criminisi, A., Shotton, J., Konukoglu, E.: Decision forests for classification, regression, density estimation, manifold learning and semi-supervised learning. Microsoft Research Cambridge, Tech, Rep. MSRTR-2011-114 5(6) (2011) 12.

[10] Zaheer, A., Pokharel, S. S., Wolfgang, C., Fishman, E. K., Horton, K. M.: Incidentally detected cystic lesions of the pancreas on CT: review of literature and management suggestions. Abdominal Imaging 38(2) (2013) 331-341.

[11] Shin, H. C., Roth, H. R., Gao, M., Lu, L., Xu, Z., Nogues, I., Yao, J., Mollura, D., Summers, R. M.: Deep convolutional neural networks for computer-aided detection: Cnn architectures, dataset characteristics and transfer learning. IEEE Transactions on Medical Imaging 35(5) (2016) 1285-1298.

[12] Ingalhalikar, M., Parker, W. A., Bloy, L., Roberts, T. P., Verma, R.: Using multi-parametric data with missing features for learning patterns of pathology, Proc. of International Conference on MICCAI (2012) 468-475.

[13] Chengwen Chu, Masahiro Oda, Takayuki Kitasaka, Kazunari Misawa, Michitaka Fujiwara, Yuichiro Hayashi, Yukitaka Nimura, Daniel Rueckert, and Kensaku Mori. Multi-organ segmentation based on spatially-divided probabilistic atlas from 3D abdominal CT images. International Conference on Medical Image Computing and Computer-Assisted Intervention, (MICCAI), pages 165-172, 292, 2013.

[14] Jia Deng, Wei Dong, Richard Socher, Li-Jia Li, Kai Li, and Li Fei-Fei. Imagenet: A large-scale hierarchical image database. Proc. of IEEE Conference on Computer Vision and Pattern Recognition, (CVPR), pages 248-255, 2009.

[15] Emily L Denton, Soumith Chintala, Rob Fergus, et al. Deep generative image models using a laplacian pyramid of adversarial networks. Advances in Neural Information Processing Systems, NIPS, pages 1486-1494, 2015.

[16] Konstantin Dmitriev, Arie E Kaufman, Ammar A Javed, Ralph H Hruban, Elliot K Fishman, Anne Marie Lennon, and Joel H Saltz. Classification of pancreatic cysts in computed tomography images using a random forest and convolutional neural network ensemble. Proc. of International Conference on Medical Image Computing and Computer-Assisted Intervention, (MICCAI), pages 303-150-158, 2017.

[17] Qi Dou, Hao Chen, Yueming Jin, Lequan Yu, Jing Qin, and Pheng-Ann Heng. 3D deeply supervised network for automatic liver segmentation from CT volumes. Proc. of International Conference on Medical Image Computing and Computer-Assisted Intervention, (MICCAI), pages 149-157, 2016.

[18] Michal Drozdzal, Gabriel Chartrand, Eugene Vorontsov, Mahsa Shakeri, Lisa Di Jorio, An Tang, Adriana Romero, Yoshua Bengio, Chris Pal, and Samuel Kadoury. Learning normalized inputs for iterative estimation in medical image segmentation. Medical image analysis, 44:1-13, 2018.

[19] Mark Everingham, Luc Van Gool, Christopher K I Williams, John Winn, and Andrew Zisserman. The pascal visual object classes (voc) challenge. International Journal of Computer Vision, 88(2): 312 303-338, 2010.

[20] Amal Farag, Le Lu, Holger R Roth, Jiamin Liu, Evrim Turkbey, and Ronald M Summers. A bottom-up approach for pancreas segmentation using cascaded superpixels and (deep) image patch labeling. IEEE Transactions on Image Processing, 26(1):386-399, 2017.

[21] Michael Götz, Christian Weber, Bram Stieltjes, Klaus Maier-Hein, and K Maier. Learning from small amounts of labeled data in a brain tumor classification task. Proc. of Neural Information Processing Systems, NIPS, 2014.

[22] Tobias Heimann, Bram Van Ginneken, Martin A Styner, Yulia Arzhaeva, Volker Aurich, Christian Bauer, Andreas Beck, Christoph Becker, Reinhard Beichel, György Bekes, et al. Comparison and evaluation of methods for liver segmentation from CT datasets. IEEE Transactions on Medical Imaging, 28(8):1251-1265, 2009.

[23] Roth Holger, Farag Amal, Turkbey Evrim, Lu Le, Liu Jiamin, and Summers Ronald. Data from pancreas—CT. Cancer Imaging Archive, 2016.

[24] Gao Huang, Zhuang Liu, Kilian Q Weinberger, and Laurens van der Maaten. Densely connected convolutional networks. Proc. of the IEEE Conference on Computer Vision and Pattern Recognition, (CVPR), 1(2):3, 2017.

[25] Simon Jégou, Michal Drozdzal, David Vazquez, Adriana Romero, and Yoshua Bengio. The one hundred layers tiramisu: Fully convolutional densenets for semantic segmentation. Proc. of IEEE on Computer Vision and Pattern Recognition Workshops (CVPRW), pages 1175-1183, 2017.

[26] Oscar Jimenez-del Toro, Henning Müller, Markus Krenn, Katharina Gruenberg, Abdel Aziz Taha, Marianne Winterstein, Ivan Eggel, Antonio Foncubierta-Rodríguez, Orcun Goksel, András Jakab, et al. Cloud-based evaluation of anatomical structure segmentation and landmark detection algorithms: Visceral anatomy benchmarks. IEEE Transactions on Medical Imaging, 35(11): 2459-2475, 2016.

[27] Diederik P Kingma and Jimmy Ba. Adam: A method for stochastic optimization. arXiv preprint:1412.6980, 2014.

[28] Christoph Lassner, Gerard Pons-Moll, and Peter V Gehler. A generative model of people in clothing. arXiv preprint arXiv:1705.04098, 2017.

[29] Tsung-Yi Lin, Michael Maire, Serge Belongie, James Hays, Pietro Perona, Deva Ramanan, Piotr, and C Lawrence Zitnick. Microsoft COCO: Common objects in context. Proc. of European on Computer Vision, (ECCV), pages 740-755, 2014.

[30] Fang Lu, Fa Wu, Peijun Hu, Zhiyi Peng, and Dexing Kong. Automatic 3D liver location and segmentation via convolutional neural network and graph cut. International Journal of Computer Radiology and Surgery, 12(2):171-182, 2017.

[31] Liqian Ma, Xu Jia, Qianru Sun, Bernt Schiele, Tinne Tuytelaars, and Luc Van Gool. Pose guided person image generation. Advances in Neural Information Processing Systems, NIPS, pages 405-415, 2017.

[32] Toshiyuki Okada, Marius George Linguraru, Masatoshi Hori, Ronald M Summers, Noriyuki Tomiyama, and Yoshinobu Sato. Abdominal multi-organ segmentation from CT images using conditional shape-location and unsupervised intensity priors. Medical Image Analysis, 26(1): 1-18, 2015.

[33] Bruno Oliveira, Sandro Queirós, Pedro Morais, Helena R Tones, João Gomes-Fonseca, Jaime C Fonseca, and João L Vilaça. A novel multi-atlas strategy with dense deformation field reconstruction for abdominal and thoracic multi-organ segmentation from computed tomography. Medical Image Analysis, 45:108-120, 2018.

[34] Sylvestre-Alvise Rebuffi, Hakan Bilen, and Andrea Vedaldi. Learning multiple visual domains with residual adapters. Advances in Neural Information Processing Systems, NIPS, pages 506-516, 2017.

[35] Scott E Reed, Zeynep Akata, Santosh Mohan, Samuel Tenka, Bernt Schiele, and Honglak Lee. Learning what and where to draw. Advances in Neural Information Processing Systems, NIPS, pages 217-225, 2016.

[36] Holger R Roth, Le Lu, Amal Farag, Hoo-Chang Shin, Jiamin Liu, Evrim B Turkbey, and Ronald M Summers. Deeporgan: Multi-level deep convolutional networks for automated pancreas segmentation. Proc. of International Conference on Medical Image Computing and Computer-Assisted Intervention, (MICCAI), pages 556-564, 2015.

[37] Holger R Roth, Hirohisa Oda, Yuichiro Hayashi, Masahiro Oda, Natsuki Shimizu, Michitaka Fujiwara, Kazunari Misawa, and Kensaku Mori. Hierarchical 3D fully convolutional networks for multi-organ segmentation. arXiv preprint arXiv:1704.06382, 2017.

[38] Aaron van den Oord, Nal Kalchbrenner, Lasse Espeholt, Oriol Vinyals, Alex Graves, et al. Conditional image generation with pixelcnn decoders. Advances in Neural Information Processing Systems, NIPS, pages 4790-4798, 2016.

[39] Robin Wolz, Chengwen Chu, Kazunari Misawa, Kensaku Mori, and Daniel Rueckert. Multi-organ abdominal CT segmentation using hierarchically weighted subject-specific atlases. Proc. Of International Conference on Medical Image Computing and Computer-Assisted Intervention (MICCAI), pages 10-17, 2012.

[40] Tianfan Xue, Jiajun Wu, Katherine Bouman, and Bill Freeman. Visual dynamics: Probabilistic future frame synthesis via cross convolutional networks. Advances in Neural Information Processing Systems, NIPS, pages 91-99, 2016.

[41] Xinchen Yan, Jimei Yang, Kihyuk Sohn, and Honglak Lee. Attribute2image: Conditional image generation from visual attributes. Proc. of European Conference on Computer Vision, (ECCV), pages 776-791, 2016.

[42] Dong Yang, Daguang Xu, S Kevin Zhou, Bogdan Georgescu, Mingqing Chen, Sasa Grbic, Dimitris Metaxas, and Dorin Comaniciu. Automatic liver segmentation using an adversarial image-to-image network. International Conference on Medical Image Computing and Computer-Assisted Intervention, (MICCAI), pages 507-515, 2017.

[43] Yuyin Zhou, Lingxi Xie, Wei Shen, Yan Wang, Elliot K Fishman, and Alan L Yuille. A fixed-point model for pancreas segmentation in abdominal CT scans. International Conference on Medical Image Computing and Computer-Assisted Intervention, (MICCAI), pages 693-701, 2017.

[44] Jun-Yan Zhu, Richard Zhang, Deepak Pathak, Trevor Darrell, Alexei A Efros, Oliver Wang, and Eli Shechtman. Toward multimodal image-to-image translation.

Advances in Neural Information Processing Systems, NIPS, pages 465-476, 2017.

What is claimed is:

1. A system for using medical imaging data to screen for at least one cystic lesion, comprising:
a computer hardware arrangement configured to:
receive first imaging information for at least one organ of at least one patient;
generate second imaging information by performing a segmentation operation on the first imaging information to identify a plurality of tissue types, including at least one tissue type indicative of the at least one cystic lesion;
identify the at least one cystic lesion in the second imaging information; and
apply a first classifier and second classifier to the at least one cystic lesion to classify the at least one cystic lesion into one or more of a plurality of cystic lesion types.

2. The system of claim 1, wherein the first classifier is a Random Forest (RF) classifier and the second classifier is a convolutional neural network classifier (CNN).

3. The system of claim 2, wherein the CNN includes at least 6 convolutional layers.

4. The system of claim 3, wherein the at least 6 convolutional layers include at least one max-pooling layer, at least one dropout layer, and at least one fully-connected layer.

5. The system of claim 4, wherein the at least one max-pooling layer includes 3 max-pooling layers, the at least one dropout layer includes 2 dropout layers, and the at least one fully-connected layer includes 3 fully-connected layers.

6. The system of claim 5, wherein the 3 fully-connected layers include the 2 dropout layers.

7. The system of claim 1, wherein the computer hardware arrangement is configured to generate the second imaging information by segmenting the first imaging information into a foreground and a background.

8. The system of claim 7, wherein the foreground includes a pancreas gland and the background include a plurality of further cystic lesions.

9. The system of claim 7, wherein the computer hardware arrangement is further configured to generate the second information by generating a plurality of segmentation outlines for the foreground and the background.

10. The system of claim 9, wherein the computer hardware arrangement is configured to apply the first classifier by analyzing at least one characteristic for the at least one patient, wherein the at least one characteristic includes at least one of (i) an age of the at least one patient, (ii) a gender of the at least one patient, (iii) a location of the at least one cystic lesion in a pancreas gland, (iv) a shape of the at least one cystic lesion, or (iv) an intensity characteristic of the at least one cystic lesion.

11. The system of claim 10, wherein the computer hardware arrangement is further configured to generate the at least one characteristic based on at least one of the segmentation outlines or intensity characteristics of the foreground.

12. The system of claim 11, wherein the segmentation operation is an automated segmentation procedure.

13. The system of claim 11, wherein the computer hardware arrangement is configured to generate the second imaging information by:
displaying the first imaging information to at least one user, and
segmenting the first imaging information based on input received from the at least one user.

14. The system of claim 11, wherein the computer hardware arrangement is configured to:
apply the first classifier to the at least one cystic lesion to generate a first set of class probabilities; and
apply the second classifier to the at least one cystic lesion to generate a second set of class probabilities.

15. The system of claim 14, wherein the computer hardware arrangement is configured to classify the at least one cystic lesion by applying the Bayesian combination to the first set of class probabilities and the second set of class probabilities.

16. The system of claim 11, wherein the computer hardware arrangement is configured to classify the at least one cystic lesion as at least one of (i) a intraductal papillary mucinous neoplasm, (ii) a mucinous cystic neoplasm, (iii) a serous cystadenoma or (iv) a solid-pseudopapillary neoplasm.

17. The system of claim 16, wherein the classification includes a probability that the at least one cystic lesion is the at least one of (i) the intraductal papillary mucinous neoplasm, (ii) the mucinous cystic neoplasm, (iii) the serous cystadenoma or (iv) the solid-pseudopapillary neoplasm.

18. The system of claim 1, wherein the at least one cystic lesion is located in a pancreas of the at least one patient.

19. A method for using medical imaging data to screen for at least one cystic lesion, comprising:
receiving first imaging information for at least one organ of at least one patient;
generating second imaging information by performing a segmentation operation on the first imaging information to identify a plurality of tissue types, including at least one tissue type indicative of the at least one cystic lesion;
identifying the at least one cystic lesion in the second imaging information; and
using a computer hardware arrangement, applying a first classifier and second classifier to the at least one cystic lesion to classify the at least one cystic lesion into one or more of a plurality of cystic lesion types.

20. A non-transitory computer-accessible medium having stored thereon computer-executable instructions for using medical imaging data to screen for at least one cystic lesion, wherein, when a computer arrangement executes the instructions, the computer arrangement is configured to perform procedures comprising:
receiving first imaging information for at least one organ of at least one patient;
generating second imaging information by performing a segmentation operation on the first imaging information to identify a plurality of tissue types, including at least one tissue type indicative of the at least one cystic lesion;
identifying the at least one cystic lesion in the second imaging information; and
applying a first classifier and second classifier to the at least one cystic lesion to classify the at least one cystic lesion into one or more of a plurality of cystic lesion types.

* * * * *